United States Patent
Nakazawa

(10) Patent No.: US 7,417,956 B2
(45) Date of Patent: Aug. 26, 2008

(54) WIRELESS COMMUNICATION SYSTEM WHICH IMPROVES RELIABILITY AND THROUGHPUT OF COMMUNICATION AND RETRANSMISSION TIMEOUT DETERMINING METHOD USED FOR THE SAME

(75) Inventor: Toru Nakazawa, Tokyo (JP)

(73) Assignee: NEC Corporation (JP)

( * ) Notice: Subject to any disclaimer, the term of this patent is extended or adjusted under 35 U.S.C. 154(b) by 793 days.

(21) Appl. No.: 10/780,957

(22) Filed: Feb. 18, 2004

(65) Prior Publication Data
US 2004/0165543 A1  Aug. 26, 2004

(30) Foreign Application Priority Data
Feb. 19, 2003  (JP)  ............................. 2003-040475

(51) Int. Cl.
H04L 12/26 (2006.01)
(52) U.S. Cl. ........................... 370/252; 370/429
(58) Field of Classification Search ................. 370/252, 370/428, 429
See application file for complete search history.

(56) References Cited

U.S. PATENT DOCUMENTS

| | | | | |
|---|---|---|---|---|
| 4,697,281 | A | * | 9/1987 | O'Sullivan ................. 455/557 |
| 7,136,645 | B2 | * | 11/2006 | Hanson et al. ............ 455/435.1 |
| 2001/0015956 | A1 | | 8/2001 | Ono |

FOREIGN PATENT DOCUMENTS

| JP | 6-252978 | 9/1994 |
|---|---|---|
| JP | 8-8995 | 1/1996 |
| JP | 10-126459 | 5/1998 |
| JP | 11-68882 | 3/1999 |
| JP | 2001-160842 | 6/2001 |
| JP | 2001-326965 | 11/2001 |
| JP | 2002-135277 | 5/2002 |
| JP | 2002-281106 | 9/2002 |
| JP | 2002-330168 | 11/2002 |
| JP | 2003-32295 | 1/2003 |

(Continued)

OTHER PUBLICATIONS

List of Prior Ars for Information Disclosure Statement prepared by applicant in connection with the instant application.

(Continued)

*Primary Examiner*—Chi Pham
*Assistant Examiner*—Phuc Tran
(74) *Attorney, Agent, or Firm*—Ostrolenk, Faber, Gerb & Soffen, LLP

(57) ABSTRACT

A wireless communication system includes a mobile terminal, a base station apparatus, a data relay apparatus and a server apparatus. One of the mobile terminal, the base station apparatus, the data relay apparatus and the server apparatus includes a transmitting unit, a monitoring unit and a determining unit. The transmitting unit transmits a transmission data and receives an acknowledgement data corresponding to the transmission data through a communication line. The monitoring unit monitors the transmission data and the acknowledgement data. The determining unit determines a retransmission timeout period based on a monitored result by the monitoring unit in a certain period. The transmitting unit retransmits the transmission data when the acknowledgement data is not received in the retransmission timeout period.

45 Claims, 17 Drawing Sheets

FOREIGN PATENT DOCUMENTS

KR 2003-0008324 1/2003
WO WO 01/93513 A2 12/2001

OTHER PUBLICATIONS

Office Action issued by Chinese Patent Office on Jan. 27, 2006 in connection with corresponding Chinese application No. 200410005801.3.

English translation of Chinese Office Action dated Jan. 27, 2006 issued in connection with corresponding Chinese applicatin No. 200410005801.3.

List of Prior Arts for Information Disclosure Statement prepared by Korean associate *Bounds on the Throughput Performance of ARQ Selective-Repeat Protocol in Markov Channels*, M. Zorzi, et. al., ICC 96, vol. 2, pp. 782-786.

Office Action issued by Korean Patent Office on Jan. 31, 2006 in connection with corresponding Korean application No. 10-2004-0010692.

Japanese translation of Korean Office Action dated Jan. 31, 2006 issued in connection with corresponding Korean application No. 10-2004-0010692.

English translation of Japanese translation of Korean Office Action dated Jan. 31, 2006 issued in connection with corresponding Korean application No. 10-2004-0010692.

Office Action issued by Japanese Patent Office on Mar. 25, 2008 in connection with corresponding Japanese application No. 2003-04047.

English translation of Japanese translation of Japanese Office Action dated Mar. 25, 2008 issued in connection with corresponding Japanese application No. 2003-04047.

\* cited by examiner

Fig. 3

| PACKET SIZE | RTT |
|---|---|
| a | RTT#1 |
| b | RTT#2 |
| c | RTT#3 |
| d | RTT#4 |
| ⋮ | ⋮ |
| n | RTT#N |

(21)

Row indices: 1, 2, 3, 4, ..., N

Fig. 12

| CHANNEL QUALITY | EXPECTATION COMMUNICATION RATE ($B_{RATE}$) | MAXIMUM CHANGE DELAY TIME ($RTT_{chg}$) |
|---|---|---|
| C1 | $B_{RATE}\#1$ | $RTT_{chg}\#1$ |
| C2 | $B_{RATE}\#2$ | $RTT_{chg}\#2$ |
| C3 | $B_{RATE}\#3$ | $RTT_{chg}\#3$ |
| C4 | $B_{RATE}\#4$ | $RTT_{chg}\#4$ |
| ⋮ | ⋮ | ⋮ |
| Ck | $B_{RATE}\#k$ | $RTT_{chg}\#k$ |

Fig. 17

| TIME ZONE | EXPECTATION COMMUNICATION RATE ($B_{RATE}$) | MAXIMUM CHANGE DELAY TIME ($RTT_{chg}$) |
|---|---|---|
| D1 | $B_{RATE}\#1$ | $RTT_{chg}\#1$ |
| D2 | $B_{RATE}\#2$ | $RTT_{chg}\#2$ |
| D3 | $B_{RATE}\#3$ | $RTT_{chg}\#3$ |
| D4 | $B_{RATE}\#4$ | $RTT_{chg}\#4$ |
| ⋮ | ⋮ | ⋮ |
| Dp | $B_{RATE}\#p$ | $RTT_{chg}\#p$ |

WIRELESS COMMUNICATION SYSTEM WHICH IMPROVES RELIABILITY AND THROUGHPUT OF COMMUNICATION AND RETRANSMISSION TIMEOUT DETERMINING METHOD USED FOR THE SAME

BACKGROUND OF THE INVENTION

1. Field of the Invention

The present invention relates to a wireless communication system which improves reliability and throughput of network, and a retransmission timeout determining method used for the same. More particularly, the present invention relates to a wireless communication system, a server, a data relay apparatus, a base station apparatus, a mobile terminal which improves reliability and throughput of network, a retransmission timeout (RTO) determining (establishing) method used for the same and its program.

2. Description of the Related Art

Conventionally, in a wireless communication system, there is a system in which a wireless communication section and a wire communication section co-exist and a data is transmitted by using TCP as a communication protocol. For example, a system, in which a portable terminal and a server carry out a two-way communication through a base station and a data relay apparatus, employs a following procedure. A receiving end transmits an acknowledgement (ACK) with regard to a received data to a transmitting end, and if the acknowledgement is not returned within a certain time after the transmitting side transmits the data, the transmitted data is retransmitted.

The retransmission timeout is the time to carry out the retransmission of the transmitted data, if the acknowledgement with regard to the transmitted data can not be received. The TCP employs a method of determining the optimal time for the retransmission timeout based on a round trip time (RTT) that is a temporal difference between a transmission time of the data and a reception time of the acknowledgement. With regard to the establishing method of this retransmission timeout, a method defined in RFC2988 widely known as a Jacobson method is typical.

However, this method uses an equation introduced by a queue theory assuming a wire network. It does not assume a network in which an error rate and a communication rate are largely varied, such as a wireless network. Thus, there is a problem that the retransmission timeout is not proper for the wireless network.

As a method of solving this problem, a following method is proposed in the Japanese Laid Open Patent Application (JP-A 2002-330168). Firstly, a queueing time data at a link layer level of the base station in the wireless communication section between the base station and the portable terminal is reported from the portable terminal to the server, as a TCP option in an SYN packet at a time of a TCP connection establishment. Next, the server analyzes the TCP option in the SYN packet and obtains the queueing time data at the link layer level of the base station. Then, the server adds this queueing time data to the retransmission timeout at a time of a TCP packet transmission. The above-mentioned queueing time data is the time equal to n (n is a positive integer) multiples of a retransmission interval T from the base station to the portable terminal at the link layer level.

Also, another establishing method of a retransmission timeout is disclosed in Japanese Laid Open Patent Application (JP-A-Heisei 8-8995). Firstly, by recording a transmission time of a transmission frame and monitoring a reception check frame, a response time is determined. Next, a dynamic retransmission timer is dynamically updated on the basis of the maximum and the minimum value of a response time, a retransmission flag and an optimal value in the past communications. Then, by using the optimal reception check frame queue timeout value, a retransmitting process is executed.

In conjunction with the above description, Japanese Laid Open Patent Application (JP-A 2002-135277) discloses a method of controlling a time-out of a communications protocol. The method of controlling a time-out of a communications protocol, includes a step which delays a part of a plurality of messages transmitted on a communication channel. The messages may be the message which should be transmitted or received.

In conjunction with the above description, Japanese Laid Open Patent Application (JP-A-Heisei 10-126459) discloses a method for setting a time-out of the transmitting and responding in the LAN equipment. The method for setting a time-out of the transmitting and responding in the LAN equipment which transmits data with a TCP/IP protocol, includes a echo demand unit, a timer, a operation unit, a time storage unit and a time-out control unit. The echo demand unit performs an echo demand of a data of a specified quantity. The timer measures a delay time form a start of data transmission to a start of data reception. The operation unit computes a retransmission time-out based on the delay time. The time storage unit stores the time-out. The time-out control unit controls the above units.

In conjunction with the above description, Japanese Laid Open Patent Application (JP-A 2002-281106) discloses a data communication method for performing data communication. The data communication method for performing data communication using a transport control protocol (TCP) among a plurality of communication terminals through a communication network containing wireless communication lines, is characterized in that a retransmission time-out in case of carrying out data transmission from the communication terminal is longer than a recommended value of a retransmission time-out time in case of constituting the communication network only by wire communication lines.

In conjunction with the above description, Japanese Laid Open Patent Application (JP-A 2001-160842) discloses a data communication system. The data communication system which transmits and receives data with an application server using the same protocol through one of transmission channels of a wire network, a wireless network and both of them, includes a first table and a retransmission timer setting unit. The first table stores a relation among a service identifier to an application server, a transmission address, a kind of a communication networks, and a processing time of the application server. The retransmission timer setting unit which calculates a processing time of the application server based on a service identifier to an application server, a transmission address and a kind of a communication networks during the data transmission to the application server with reference to the first table, and set up the processing time as a retransmission time.

In conjunction with the above description, Japanese Laid Open Patent Application (JP-A-Heisei 06-252978) discloses a network parameter automatic adjusting apparatus. The network parameter automatic adjusting apparatus includes a transmission parameter table, a transmission control means, a parameter adjustment control means and a parameter adjustment means. The transmission parameter table is installed in each of a plurality of computers connected on a network and describes a data retransmission interval and a data retransmission count for a reply queue time and a time-out of the reply queue time, as parameters. The transmission control means performs a data transmission with another computer through the above-mentioned network based on the parameters described in the transmission parameter table. The parameter adjustment control means makes the transmission control means transmit a frame for a transmission performance check to a transmission control means of the other computer, and measures a response period from transmitting the frame to receiving a response frame to the performance check frame transmitted by the other computer, and makes the transmission control means transmit another response frame to the performance check frame transmitted by the other computer. The parameter adjustment means corrects each parameter described in the transmission parameter table based on a response time of the performance check frame measured by the parameter adjustment control means.

In case of the technique of the JP-A 2002-330168, the above-mentioned conventional retransmission timeout establishing method establishes the retransmission timeout in accordance with the queueing time data at the link layer level of the base station. Thus, in the system in which the base stations of different manufacturers co-exist, there may be a possibility that the magnification n and the retransmission interval T at the link layer level from the base station to the portable terminal is different for each base station. Hence, this causes the problem that it is impossible for the conventional method to treat this case. Also, the technique of the JP-A 2002-330168 has a problem that since it uses the TCP option of the SYN packet, it can not be applied to a system or a network if the TCP option can not be used.

The technique of the JP-A-Heisei 8-008995 has also a problem that if the maximum and the minimum response times at the time of the past communications are updated, the interval between the maximum response time and the minimum response time becomes large. If the error rate and the communication rate are largely varied in the network, such as the wireless network. The retransmission timeout is not proper for the communication.

SUMMARY OF THE INVENTION

Therefore, an object of the present invention is to provide a wireless communication system, a server, a data relay apparatus, a base station apparatus, a mobile terminal and a retransmission timeout determining method used for them, and its program, which can optimize a retransmission timeout in a communication network including a wireless communication network.

Another object of the present invention is to provide a wireless communication system, a server, a data relay apparatus, a base station apparatus, a mobile terminal and a retransmission timeout determining method used for them, and its program, which can optimize a communication utilization rate.

Still another object of the present invention is to provide a wireless communication system, a server, a data relay apparatus, a base station apparatus, a mobile terminal and a retransmission timeout determining method used for them, and its program, which can improve a throughput.

This and other objects, features and advantages of the present invention will be readily ascertained by referring to the following description and drawings.

In order to achieve an aspect of the present invention, the present invention provides a wireless communication system including: a mobile terminal; a base station apparatus; a data relay apparatus; and a server apparatus. One of the mobile terminal, the base station apparatus, the data relay apparatus and the server apparatus includes: a transmitting unit, a monitoring unit and a determining unit. The transmitting unit transmits a transmission data and receives an acknowledgement data corresponding to the transmission data through a communication line. The monitoring unit monitors the transmission data and the acknowledgement data. The determining unit determines a retransmission timeout period based on a monitored result by the monitoring unit in a certain period. The transmitting unit retransmits the transmission data when the acknowledgement data is not received in the retransmission timeout period.

In the wireless communication system of the present invention, the communication line includes a wireless communication line and a wire communication line.

In the wireless communication system of the present invention, the determining unit determines the retransmission timeout period based on the monitored result in a most recent certain period.

In the wireless communication system of the present invention, the monitoring unit monitors a round trip time and a data size(Dmin, Dmax, Dsize) of the transmission data. The round trip time is a time difference between a transmission time of the transmission data and a reception time of the acknowledgement data.

In the wireless communication system of the present invention, the determining unit determines the retransmission timeout period by a calculation based on the minimum of the round trip time, a data size of the minimum of the round trip time, the maximum of the round trip time and a data size of the maximum of the round trip time.

In the wireless communication system of the present invention, the determining unit estimates an expectation communication rate of the communication line based on the data size of the minimum of the round trip time and the minimum of the round trip time, and calculates the retransmission timeout period based on the expectation communication rate and a data size of the transmission data, the maximum of the round trip time and the data size of the maximum of the round trip time.

The wireless communication system of the present invention, further includes a memory unit which stores a monitoring history of the round trip time and the data size. The determining unit uses the data size of the minimum of the round trip time and the minimum of the round trip time stored in the memory unit for estimating the expectation communication rate.

In the wireless communication system of the present invention, the determining unit estimates a maximum variation delay time of the communication line based on the data size of the maximum of the round trip time, the maximum of the round trip time and the expectation communication rate, and calculates the retransmission timeout period based on the expectation communication rate, the maximum variation delay time and the data size of the transmission data.

The wireless communication system of the present invention, further includes a storage unit which associates a usage situation of the communication line with an expectation communication rate of the communication line and a maximum variation delay time of the communication line, and stores them. The determining unit obtains the usage situation of the communication line, and calculates the retransmission timeout period based on the data size of the transmission data, the usage situation, the expectation communication rate and the maximum variation delay time. The expectation communication rate and the maximum variation delay time are obtained from the storage unit based on the usage situation.

In the wireless communication system of the present invention, the usage situation is one of a traffic condition of the communication line, a channel quality of the communication line and a time zone of a time of transmitting the transmission data.

In order to achieve another aspect of the present invention, the present invention provides an information processing apparatus used for a wireless communication, including: a transmitting unit, a monitoring unit and a determining unit. The transmitting unit transmits a transmission data and receives an acknowledgement data corresponding to the transmission data through a communication line. The monitoring unit monitors the transmission data and the acknowledgement data. The determining unit determines a retransmission timeout period based on a monitored result by the monitoring unit in a certain period. The transmitting unit retransmits the transmission data when the acknowledgement data is not received in the retransmission timeout period.

In the information processing apparatus of the present invention, the communication line includes a wireless communication line and a wire communication line.

In the information processing apparatus of the present invention, the determining unit determines the retransmission timeout period based on the monitored result in a most recent certain period.

In the information processing apparatus of the present invention, the monitoring unit monitors a round trip time and a data size(Dmin, Dmax, Dsize) of the transmission data. The round trip time is a time difference between a transmission time of the transmission data and a reception time of the acknowledgement data.

In the information processing apparatus of the present invention, the determining unit determines the retransmission timeout period by a calculation based on the minimum of the round trip time, a data size of the minimum of the round trip time, the maximum of the round trip time and a data size of the maximum of the round trip time.

In the information processing apparatus of the present invention, the determining unit estimates an expectation communication rate of the communication line based on the data size of the minimum of the round trip time and the minimum of the round trip time, and calculates the retransmission timeout period based on the expectation communication rate and a data size of the transmission data, the maximum of the round trip time and the data size of the maximum of the round trip time.

The information processing apparatus of the present invention, further includes a memory unit which stores a monitoring history of the round trip time and the data size. The determining unit uses the data size of the minimum of the round trip time and the minimum of the round trip time stored in the memory unit for estimating the expectation communication rate.

In the information processing apparatus of the present invention, the determining unit estimates a maximum variation delay time of the communication line based on the data size of the maximum of the round trip time, the maximum of the round trip time and the expectation communication rate, and calculates the retransmission timeout period based on the expectation communication rate, the maximum variation delay time and the data size of the transmission data.

The information processing apparatus of the present invention, further includes a storage unit which associates a usage situation of the communication line with an expectation communication rate of the communication line and a maximum variation delay time of the communication line, and stores them. The determining unit obtains the usage situation of the communication line, and calculates the retransmission timeout period based on the data size of the transmission data, the usage situation, the expectation communication rate and the maximum variation delay time. The expectation communication rate and the maximum variation delay time are obtained from the storage unit based on the usage situation.

In the information processing apparatus of the present invention, the usage situation is one of a traffic condition of the communication line, a channel quality of the communication line and a time zone of a time of transmitting the transmission data. In order to achieve still another aspect of the present invention, the present invention provides a mobile terminal used for a wireless communication, including: a transmitting unit, a monitoring unit and a determining unit. The transmitting unit transmits a transmission data and receives an acknowledgement data corresponding to the transmission data through a communication line. The monitoring unit monitors the transmission data and the acknowledgement data. The determining unit determines a retransmission timeout period based on a monitored result by the monitoring unit in a certain period. The transmitting unit retransmits the transmission data when the acknowledgement data is not received in the retransmission timeout period.

In the mobile terminal of the present invention, the communication line includes a wireless communication line and a wire communication line.

In the mobile terminal of the present invention, the determining unit determines the retransmission timeout period based on the monitored result in a most recent certain period.

In the mobile terminal of the present invention, the monitoring unit monitors a round trip time and a data size(Dmin, Dmax, Dsize) of the transmission data. The round trip time is a time difference between a transmission time of the transmission data and a reception time of the acknowledgement data.

In the mobile terminal of the present invention, the determining unit determines the retransmission timeout period by a calculation based on the minimum of the round trip time, a data size of the minimum of the round trip time, the maximum of the round trip time and a data size of the maximum of the round trip time.

In the mobile terminal of the present invention, the determining unit estimates an expectation communication rate of the communication line based on the data size of the minimum of the round trip time and the minimum of the round trip time, and calculates the retransmission timeout period based on the expectation communication rate and a data size of the transmission data, the maximum of the round trip time and the data size of the maximum of the round trip time.

The mobile terminal of the present invention, further includes a memory unit which stores a monitoring history of the round trip time and the data size. The determining unit uses the data size of the minimum of the round trip time and the minimum of the round trip time stored in the memory unit for estimating the expectation communication rate.

In the mobile terminal of the present invention, the determining unit estimates a maximum variation delay time of the communication line based on the data size of the maximum of the round trip time, the maximum of the round trip time and the expectation communication rate, and calculates the retransmission timeout period based on the expectation communication rate, the maximum variation delay time and the data size of the transmission data.

The mobile terminal of the present invention, further includes a storage unit which associates a usage situation of the communication line with an expectation communication rate of the communication line and a maximum variation delay time of the communication line, and stores them. The determining unit obtains the usage situation of the communication line, and calculates the retransmission timeout period based on the data size of the transmission data, the usage situation, the expectation communication rate and the maximum variation delay time. The expectation communication rate and the maximum variation delay time are obtained from the storage unit based on the usage situation.

In the mobile terminal of the present invention, the usage situation is one of a traffic condition of the communication line, a channel quality of the communication line and a time zone of a time of transmitting the transmission data.

In order to achieve yet still another aspect of the present invention, the present invention provides a determination method of a retransmission timeout period, including: transmitting a transmission data and receiving an acknowledgement data which corresponds to the transmission data through a communication line; monitoring the transmission data and the acknowledgement data; and determining a retransmission timeout period based on a monitored result in a certain period. The transmission data is retransmitted when the acknowledgement data is not received in the retransmission timeout period.

In the determination method of the present invention, the communication line includes a wireless communication line and a wire communication line.

In the determination method of the present invention, the determining step includes: determining the retransmission timeout period based on the monitored result in a most recent certain period.

In the determination method of the present invention, the monitoring step includes: monitoring a round trip time and a data size(Dmin, Dmax, Dsize) of the transmission data, and the round trip time is a time difference between a transmission time of the transmission data and a reception time of the acknowledgement data.

In the determination method of the present invention, the determining step includes: determining the retransmission timeout period by a calculation based on the minimum of the round trip time, a data size of the minimum of the round trip time, the maximum of the round trip time and a data size of the maximum of the round trip time.

In the determination method of the present invention, the determining step includes: estimating an expectation communication rate of the communication line based on the data size of the minimum of the round trip time and the minimum of the round trip time, and calculating the retransmission timeout period based on the expectation communication rate and a data size of the transmission data, the maximum of the round trip time and the data size of the maximum of the round trip time.

In the determination method of the present invention, further includes: storing a monitoring history of the round trip time and the data size. In the estimating step, the data size of the minimum of the round trip time and the minimum of the round trip time stored in the memory unit are used for estimating the expectation communication rate.

In the determination method of the present invention, the calculating step includes: estimating a maximum variation delay time of the communication line based on the data size of the maximum of the round trip time, the maximum of the round trip time and the expectation communication rate, and calculating the retransmission timeout period based on the expectation communication rate, the maximum variation delay time and the data size of the transmission data.

The determination method of the present invention, further includes: associating a usage situation of the communication line with an expectation communication rate of the communication line and a maximum variation delay time of the communication line; storing the usage situation, the expectation communication rate and the maximum variation delay time; obtaining the usage situation of the communication line, and calculating the retransmission timeout period based on the data size of the transmission data, the usage situation, the expectation communication rate and the maximum variation delay time. The expectation communication rate and the maximum variation delay time are obtained from the storage unit based on the usage situation.

In the determination method of the present invention, the usage situation is one of a traffic condition of the communication line, a channel quality of the communication line and a time zone of a time of transmitting the transmission data.

In order to achieve yet still another aspect of the present invention, the present invention provides a computer program product embodied on a computer-readable medium and including code that, when executed, causes a computer to perform the following: transmitting a transmission data and receiving an acknowledgement data which corresponds to the transmission data through a communication line; monitoring the transmission data and the acknowledgement data; and determining a retransmission timeout period based on a monitored result in a certain period. The transmission data is retransmitted when the acknowledgement data is not received in the retransmission timeout period.

In the computer program product of the present invention, the communication line includes a wireless communication line and a wire communication line.

In the computer program product of the present invention, the determining step includes: determining the retransmission timeout period based on the monitored result in a most recent certain period.

In the computer program product of the present invention, the monitoring step includes: monitoring a round trip time and a data size(Dmin, Dmax, Dsize) of the transmission data. The round trip time is a time difference between a transmission time of the transmission data and a reception time of the acknowledgement data.

In the computer program product of the present invention, the determining step includes: determining the retransmission timeout period by a calculation based on the minimum of the round trip time, a data size of the minimum of the round trip time, the maximum of the round trip time and a data size of the maximum of the round trip time.

In the computer program product of the present invention, the determining step includes: estimating an expectation communication rate of the communication line based on the data size of the minimum of the round trip time and the minimum of the round trip time; and calculating the retransmission timeout period based on the expectation communication rate and a data size of the transmission data, the maximum of the round trip time and the data size of the maximum of the round trip time.

The computer program product of the present invention, further includes: storing a monitoring history of the round trip time and the data size. In the estimating step, the data size of the minimum of the round trip time and the minimum of the round trip time stored in the memory unit are used for estimating the expectation communication rate.

In the computer program product of the present invention, the calculating step includes: estimating a maximum variation delay time of the communication line based on the data size of the maximum of the round trip time, the maximum of the round trip time and the expectation communication rate; and calculating the retransmission timeout period based on the expectation communication rate, the maximum variation delay time and the data size of the transmission data.

The computer program product of the present invention, further includes: associating a usage situation of the communication line with an expectation communication rate of the communication line and a maximum variation delay time of the communication line; storing the usage situation, the expectation communication rate and the maximum variation delay time; obtaining the usage situation of the communication line; and calculating the retransmission timeout period based on the data size of the transmission data, the usage situation, the expectation communication rate and the maximum variation delay time. The expectation communication rate and the maximum variation delay time are obtained from the storage unit based on the usage situation.

In the computer program product of the present invention, the usage situation is one of a traffic condition of the communication line, a channel quality of the communication line and a time zone of a time of transmitting the transmission data.

Computer program product with program code means for carrying out all steps above-mentioned method if the program runs on a computer.

Computer program product with program code means above-mentioned method which are stored on a storage means which can be read by the computer.

Thus, in the wireless communication system according to the present invention, it is possible to minimize the time until the detection of the loss of the data and reduce the useless retransmission caused by the cross between the acknowledgement and the data. These leads to improving the throughput and optimizing the communication utilization rate.

FIG. 3 is a view showing the configuration example of the RTT memory unit;

FIG. 12 is a view showing a configuration example of an RTT memory unit according to a third embodiment in the present invention;

FIG. 17 is a view showing a configuration another example of an RTT memory unit according to a third embodiment in the present invention.

DESCRIPTION OF THE PREFERRED EMBODIMENTS

Embodiments of a wireless communication system, a server, a data relay apparatus, a base station apparatus, a mobile terminal and a retransmission timeout determining method according to the present invention will be described below with reference to the attached drawings.

The First Embodiment

The embodiments of the present invention will be described below with reference to the drawings.

Figure 1:
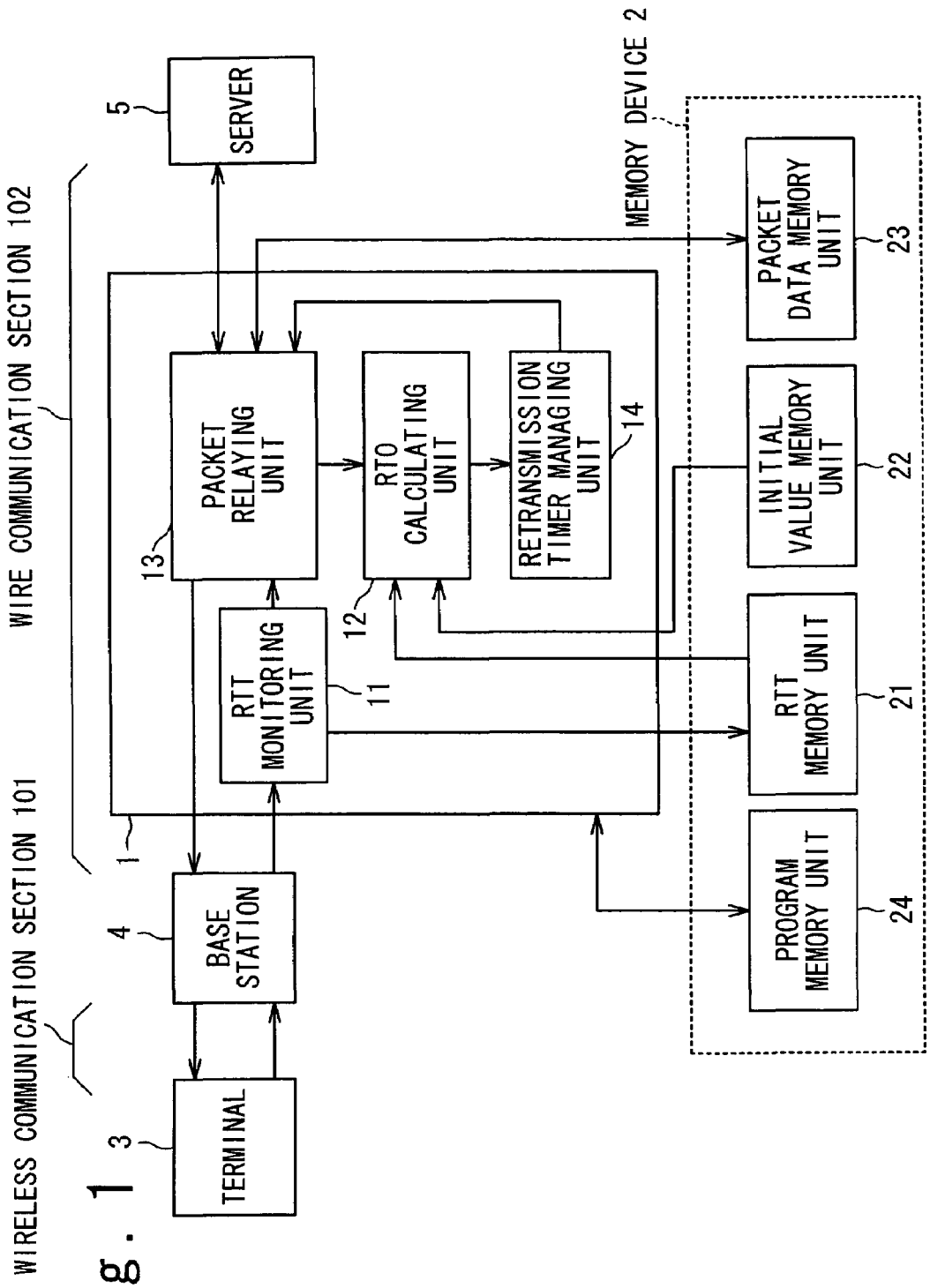
FIG. 1 is a block diagram showing a configuration of a wireless communication system according to a first embodiment in the present invention.

FIG. 1 is a block diagram showing a configuration of a wireless communication system according to a first embodiment in the present invention. In FIG. 1, the wireless communication system according to the first embodiment in the present invention includes a data relay apparatus (hereafter, referred to as a relay apparatus) 1, a terminal 3, a base station 4 and a server 5, and a memory device 2 is connected to the relay apparatus 1. The memory device 2 may be installed in the data relay apparatus 1. The relay apparatus 1, the terminal 3, the base station and the server 5 are the information processing apparatuses (processors).

The terminal 3 and the server 5 carry out the two-way communication, in which TCP/IP (Transmission Control Protocol/Internet Protocol) is used as a communication protocol, through the relay apparatus 1 and the base station 4. A section between the terminal 3 and the base station 4 is a wireless communication section 101, and a section between the base station 4 and the server 5 through the relay apparatus 1 is a wire communication section 102. The wireless communication section 101 is poorer in communication quality than the wire communication section 102. Thus, there may be a case that a packet is lost or a packet pass time is largely varied.

The retransmission timeout (RTO) of the TCP between the terminal 3 and the server 5 is calculated based on a round trip time (RTT).

Figure 2:
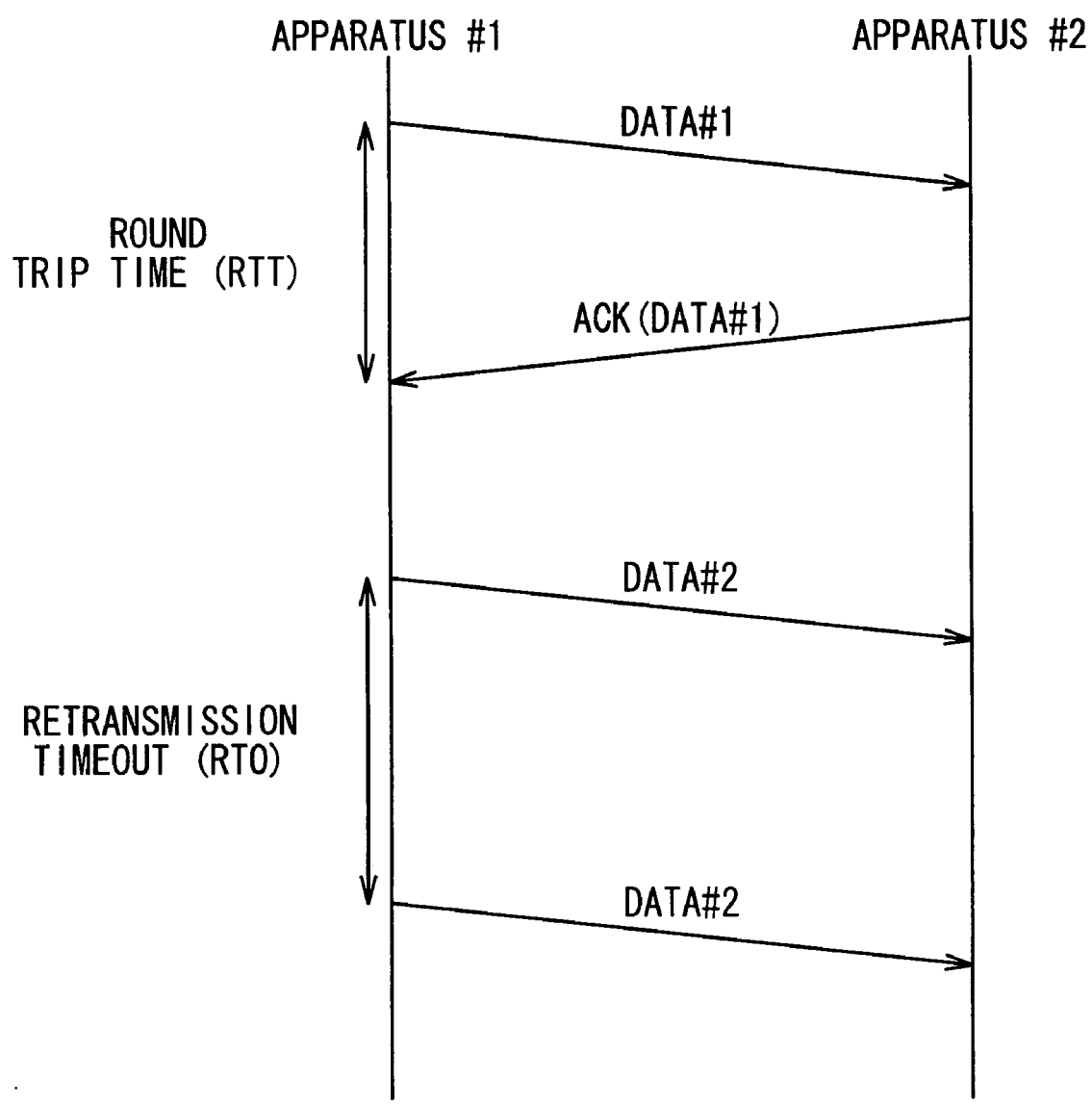
FIG. 2 is a time chart showing the round trip time (RTT) and the retransmission timeout (RTO)

FIG. 2 is a time chart showing the round trip time (RTT) and the retransmission timeout (RTO). Here, the round trip time (RTT) is the period that from a time of a transmission of a data #1 to time of a reception of an acknowledgement (ACK) with regard to the data #1. Also, the retransmission timeout (RTO) is the period that from a time of a transmission of a data #2 to a time of a retransmission of the data #1 when an acknowledgement with regard to the transmitted data #2 is not received.

An RTT monitoring unit (means) 11 of the relay apparatus 1 monitors the round trip time (RTT) of a communication path including the wireless communication section 101. It records the round trip time (RTT) and the packet size in an RTT memory unit 21 in the memory device 2. An RTO calculating unit (means) 12 retrieves the maximum round trip time and the minimum round trip time from the round trip time (RTT)

recorded in the RTT memory unit 21. Based on them, it calculates the retransmission timeout (RTO).

This retransmission timeout (RTO) is used when a packet relaying unit (means) 13 relays the packet from the server 5 to the terminal 3. It is used to establish for a retransmission timer managing unit (means) 14 as a timer until the execution of the retransmission when the packet loss is induced in the wireless communication section 101.

Consequently, in the case of the variation in the round trip time (RTT) of the communication path including the wireless communication section 101, it is possible to carry out the retransmission control quickly following the network situation of the wireless communication section 101. In the case of the sharp increase in the round trip time (RTT), it is possible to protect the repetition of the useless retransmissions. In the case of the sharp decrease in the round trip time (RTT), it is possible to prevent requiring a long time until the detection of the packet loss. These lead to improving of the throughput.

The wireless communication system according to the first embodiment of the present invention will be described below in detail. The wireless communication system according to the first embodiment of the present invention includes: the terminal 3 such as a portable telephone, a PC (Personal Computer) and the like; the base station 4; the relay apparatus 1 operated based on a program control; the server 5 such as a workstation and the like; and the memory device 2 for recording an information. The network between the terminal 3 and the base station 4 is a wireless communication section 101. The network between the base station 4 and the server 5 through the relay apparatus 1 is the wire communication section 102.

The relay apparatus 1 includes the RTT monitoring unit 11, the RTO calculating unit 12; the packet relaying unit 13 and the retransmission timer managing unit 14. The memory device 2 includes the RTT memory unit 21, an initial value memory unit 22, a packet data memory unit 23 and a program memory unit 24 for storing a program (a program that can be executed in the computer) to be executed in the relay apparatus 1. The initial value memory unit 22 preliminarily stores the initial value of the retransmission timeout (RTO), the upper limit value and lower limit value of the retransmission timeout (RTO), the safety coefficient ã and the holding maximum value (number) of the round trip time (RTT) measurement value.

The RTT monitoring unit 11 monitors the packet communication in the communication path including the wireless communication section 101. When receiving the acknowledgement (ACK) from the terminal 3 with regard to the packet (data packet) including the data transmitted by the packet relaying unit 13, it calculates the round trip time (RTT) which is the differential time between the transmission time of the data packet recorded in the packet and the present time [namely, the reception time of the acknowledgement (ACK)]. It makes the packet size of the packet and the round trip time (RTT) into one set, and then records in the RTT memory unit 21 at a session (logical connection) unit in the TCP. After that, the acknowledgement (ACK) is passed to the packet relaying unit 13 without modification.

The RTO calculating unit 12 calculates the retransmission timeout (RTO) when the packet is relayed from the packet relaying unit 13 to the terminal 3. At first, the RTO calculating unit 12 obtains the packet size (this is referred to as Dsize) of the packet that is going to be relayed from the packet relaying unit 13.

Next, the RTO calculating unit 12 retrieves the maximum and minimum values from the round trip times (RTT) stored in the RTT memory unit 21. Then, it obtains them together with the combined packet sizes (they are assumed to be Dmax and Dmin, respectively). Finally, the RTO calculating unit 12 calculates the retransmission timeout (RTO) from the packet size Dsize and the packet sizes Dmax and Dmin, and establishes for the retransmission timer managing unit 14.

Also, since there is not the calculated retransmission timeout (RTO) at the time of the connection start, the RTO calculating unit 12 establishes, for the retransmission timer managing unit 14, the initial value of the retransmission timeout (RTO) obtained from the initial value memory unit 22 as the retransmission timeout (RTO).

The packet relaying unit 13 carries out the packet relay between the wire communication section 102 and the communication path including the wireless communication section 101. The packet relaying unit 13 stores the received packet in the packet data memory unit 23, and relays the packet, which arrives from the communication path including the wireless communication section 101, to the wire communication section 102. Also in the opposite direction, it is similarly relayed from the wire communication section 102 to the communication path including the wireless communication section 101.

The retransmission timer managing unit 14 has therein a retransmission timer (not shown). When the retransmission timeout (RTO) is established, it waits for the elapse of the established time from that time point. If the established time is elapsed, it reports the retransmission timeout to the packet relaying unit 13. The packet relaying unit 13 receiving the report obtains the packet data to be retransmitted from the packet data memory unit 23, and carries out the packet retransmission.

FIG. 3 is a view showing the configuration example of the RTT memory unit 21 in FIG. 1. In FIG. 3, the RTT memory unit 21 stores N sets of packet sizes (a1, a2, a3, a4, ..., an) andround trip times (RTT) (RTT#1, RTT#2, RTT#3, RTT#4, ..., RTT#N). Here, n and N (n=N) are positive integers.

Figure 4:
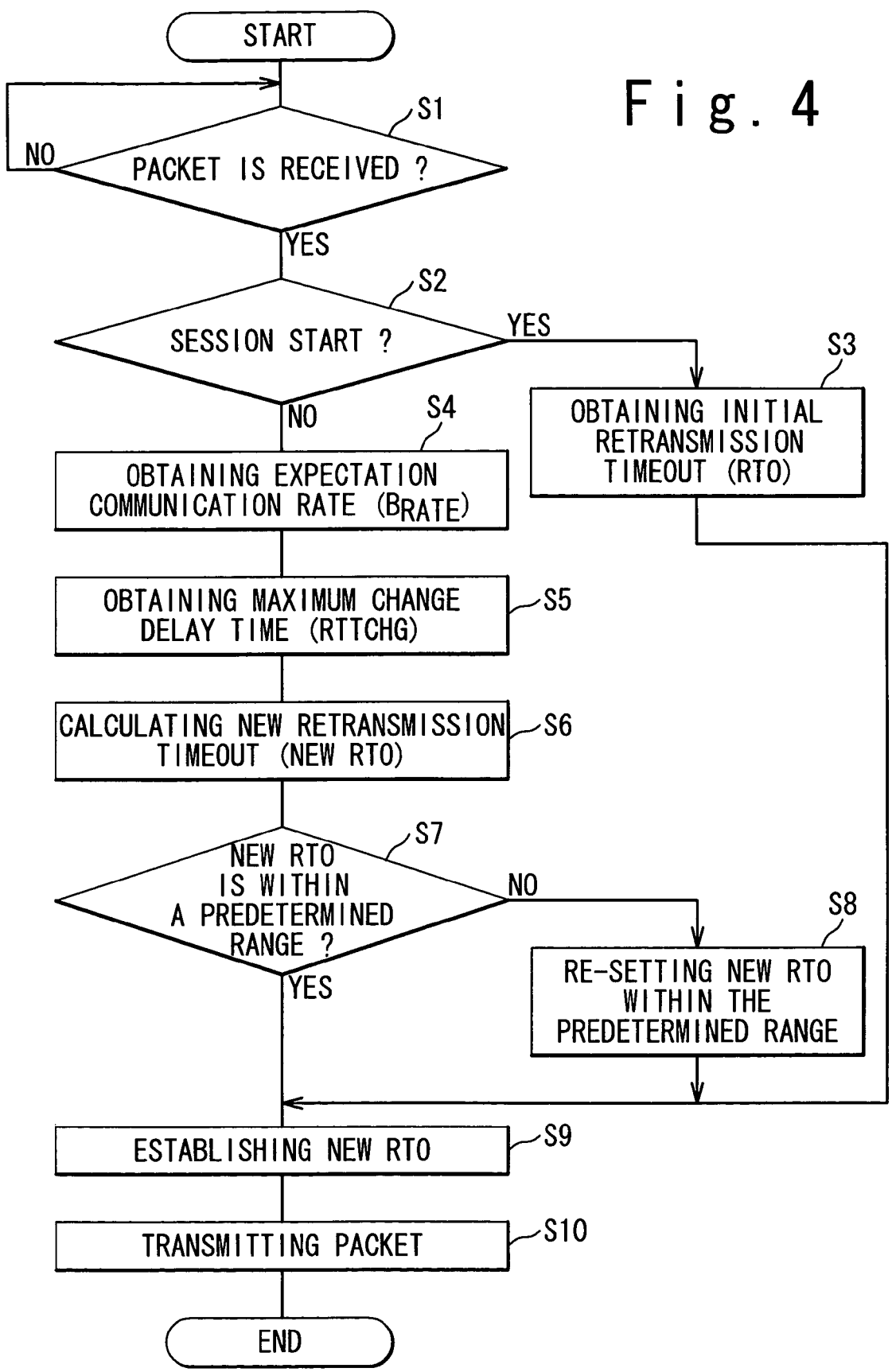
FIG. 4 is a flowchart showing the calculating process for the retransmission timeout (RTO) of the relay apparatus.

FIG. 4 is a flowchart showing the calculating process for the retransmission timeout (RTO) of the relay apparatus 1 in FIG. 1. The calculating process for the retransmission timeout (RTO) of the relay apparatus 1 will be described below with reference to FIGS. 1 to 4.

When the packet arrives from the server 5, the packet relaying unit 13 of the relay apparatus 1 stores the packet in the packet data memory unit 23 of the memory device 2. Then, it investigates the packet size of the packet and reports to the RTO calculating unit 12. The RTO calculating unit 12 judges whether or not the packet is the first packet from which the session (logical start) is started (Steps S1, S2).

The RTO calculating unit 12, if it is the first packet, obtains the retransmission timeout (RTO) from the initial value memory unit 22 (Step S3). It establishes the initial value of the obtained retransmission timeout (RTO) for the retransmission timer managing unit 14 (Step S9). Then, the packet relaying unit 13 carries out the packet transmission (Step S10).

The RTO calculating unit 12, if it is not the first packet, obtains an expectation communication rate ($B_{RATE}$) to be expected in the communication path including the wireless communication section 101 (Step S4). Then, it obtains a maximum change delay time (RTTchg) to be expected (Step S5) and calculates a new retransmission timeout (new RTO) (Step S6).

The RTO calculating unit 12, if the calculated retransmission timeout (new RTO) is not within a predetermined range established for the initial value memory unit 22 (Step S7: No), re-sets the retransmission timeout (new RTO) to the value within the predetermined range (Step S8). Then, it establishes the value for the retransmission timer managing unit 14 (Step S9).

Also, the RTO calculating unit 12, if the calculated retransmission timeout (new RTO) is within the predetermined range (Step S7: Yes), establishes the retransmission timeout (new RTO) for the retransmission timer managing unit 14 (Step S9). After that, the packet relaying unit 13 transmits the packet to the terminal 3 (Step S10).

Figure 5:
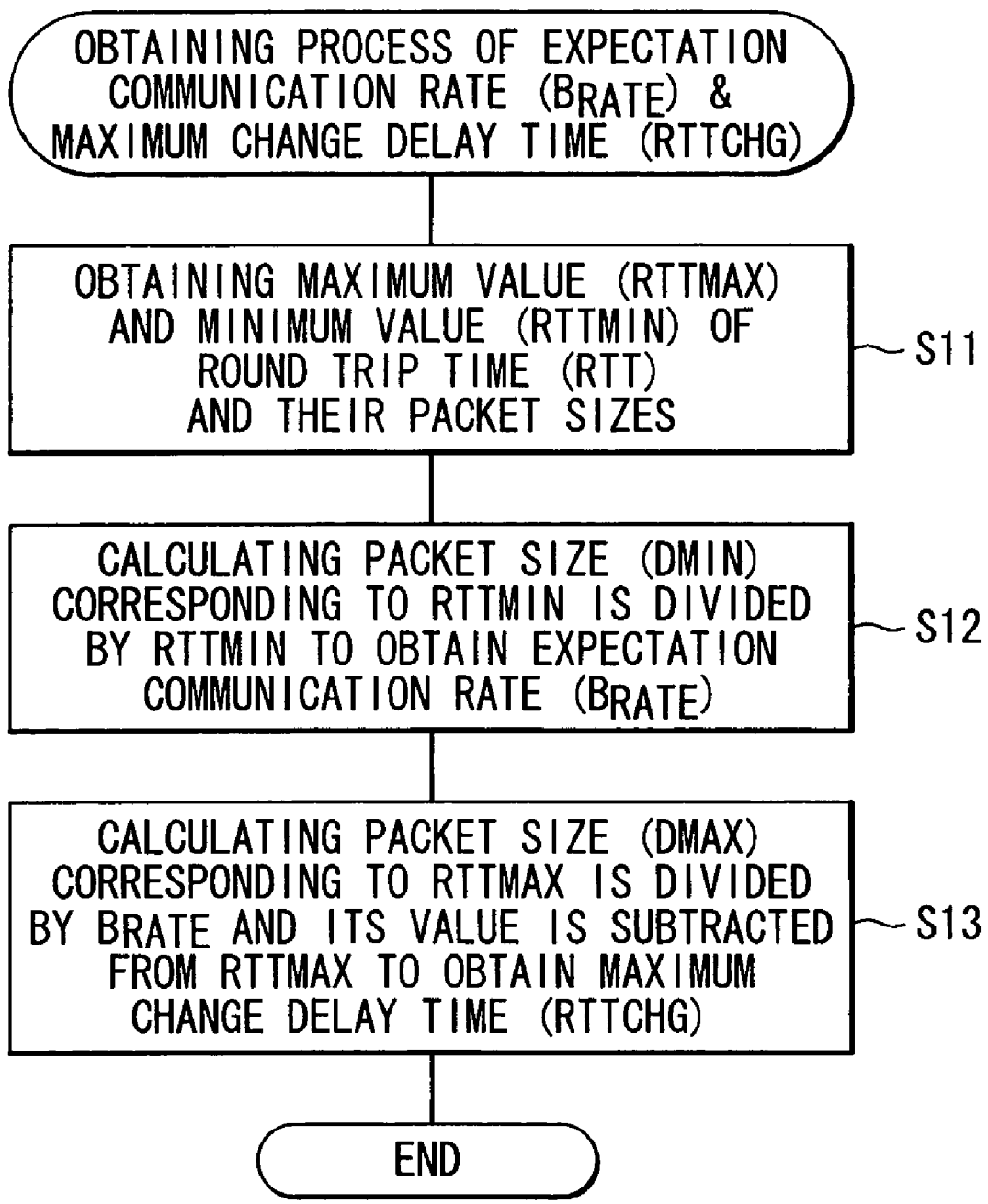
FIG. 5 is a flowchart showing the obtaining process for the expectation communication rate ($B_{RATE}$) & the maximum change (variation) delay time (RTTchg)
Figure 6:
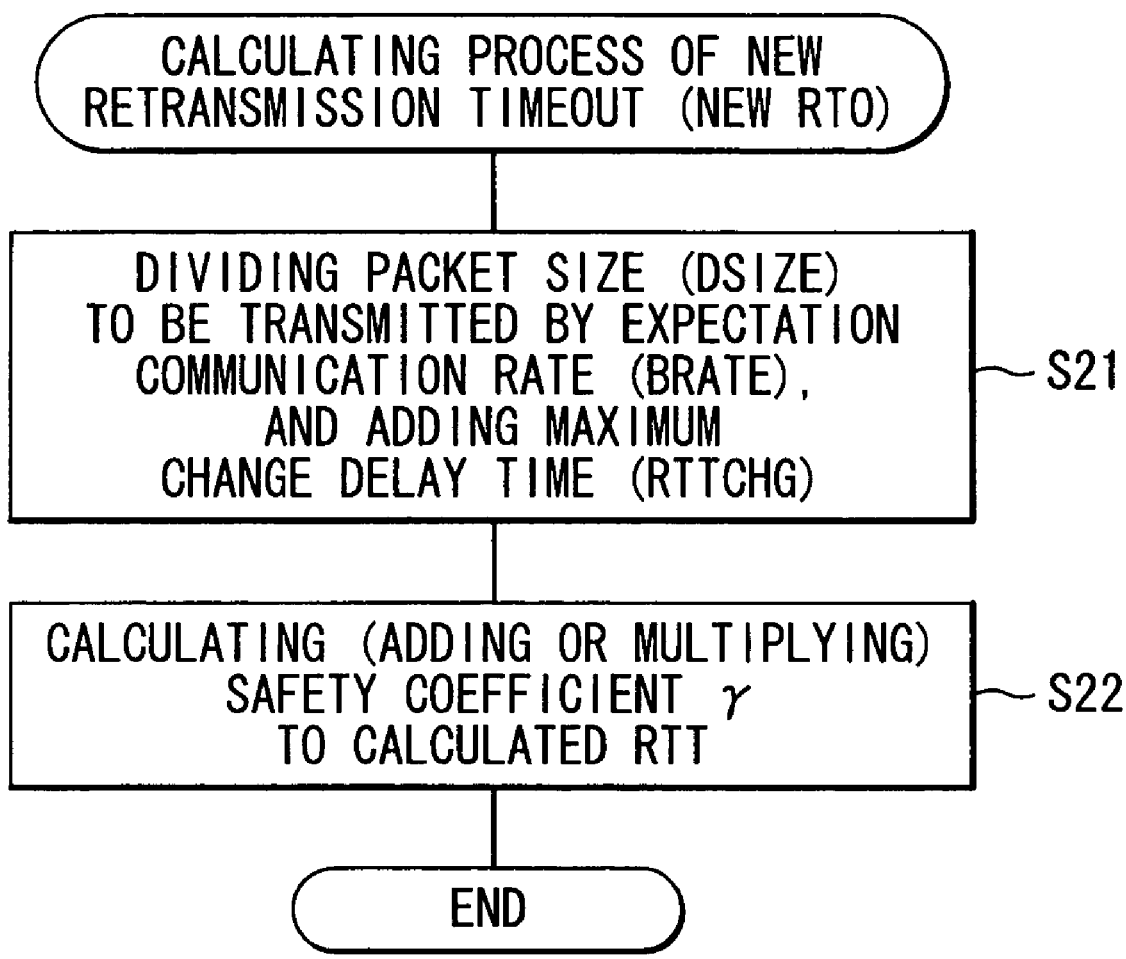
FIG. 6 is a flowchart showing the calculating process for the retransmission timeout (new RTO)

FIG. 5 is a flowchart showing the obtaining process for the expectation communication rate ($B_{RATE}$) & the maximum change (variation) delay time (RTTchg) of FIG. 4. FIG. 6 is a flowchart showing the calculating process for the retransmission timeout (new RTO) of FIG. 4. The operation of the RTO calculating unit 12 will be described below with reference to FIGS. 5, 6.

The RTO calculating unit 12 retrieves the maximum value (RTTmax) and minimum value (RTTmin) of the round trip time (RTT) from the RTT memory unit 21, in the obtaining process of the expectation communication rate ($B_{RATE}$) & the maximum change delay time (RTTchg). Then, it obtains them together with the packet size combined with them (Step S11).

The RTO calculating unit 12 defines the result that the packet size (Dmin) corresponding to the minimum value (RTTmin) of the obtained round trip times (RTT) is divided by the minimum value (RTTmin), as the expectation communication rate ($B_{RATE}$) (Step S12). In short, the expectation communication rate ($B_{RATE}$) is calculated by the equation:

$$B_{RATE}(\text{Byte/sec}) = D\text{min}(\text{Byte})/RTT\text{min}(\text{sec})$$

Next, the RTO calculating unit 12 defines the result that the packet size (Dmax) corresponding to the maximum value (RTTmax) of the round trip times (RTT) is divided by the expectation communication rate ($B_{RATE}$) and its value is subtracted from the maximum value (RTTmax), as the maximum change delay time (RTTchg) (Step S13). This maximum change delay time (RTTchg) is the expectable value, and this is calculated from the equation:

$$RTT\text{chg} = RTT\text{max} - (D\text{max}/B_{RATE})$$

Here, the steps S11 and S12 are included in the step S4. The step S13 is included in the step S5.

The RTO calculating unit 12 divides the transmitted packet size (Dsize) by the expectation communication rate ($B_{RATE}$), and adds the maximum change delay time (RTTchg), to calculate the maximum expectation round trip time (RTT) (Step S21). In short, the maximum expectation round trip time (RTT) is calculated by the equation:

Maximum Expectation $RTT = D\text{size}/B_{RATE} + RTT\text{chg}$

The RTO calculating unit 12 calculates (adds or multiplies) the safety coefficient a established for the initial value memory unit 22 to the calculated maximum expectation round trip time (RTT). It defines the result as the retransmission timeout (new RTO) (Step S22). This retransmission timeout (new RTO) is calculated by the equation:

New $RTO$ = Maximum Expectation $RTT + ã1$ or,

New $RTO$ = Maximum Expectation $RTT \times ã2$

Here, the steps S21 and S22 are included in the step S6.

The safety coefficient ã is the coefficient so as not to induce the excessive retransmission. The range of ã1 is 0 or more, and the range of ã2 is 1 or more. However, these values should be adjusted such that the time until the detection of the loss is not excessively long when the packet is lost. In case of the practical use, it is desired to enable suitable value to be set in anytime.

Figure 7:
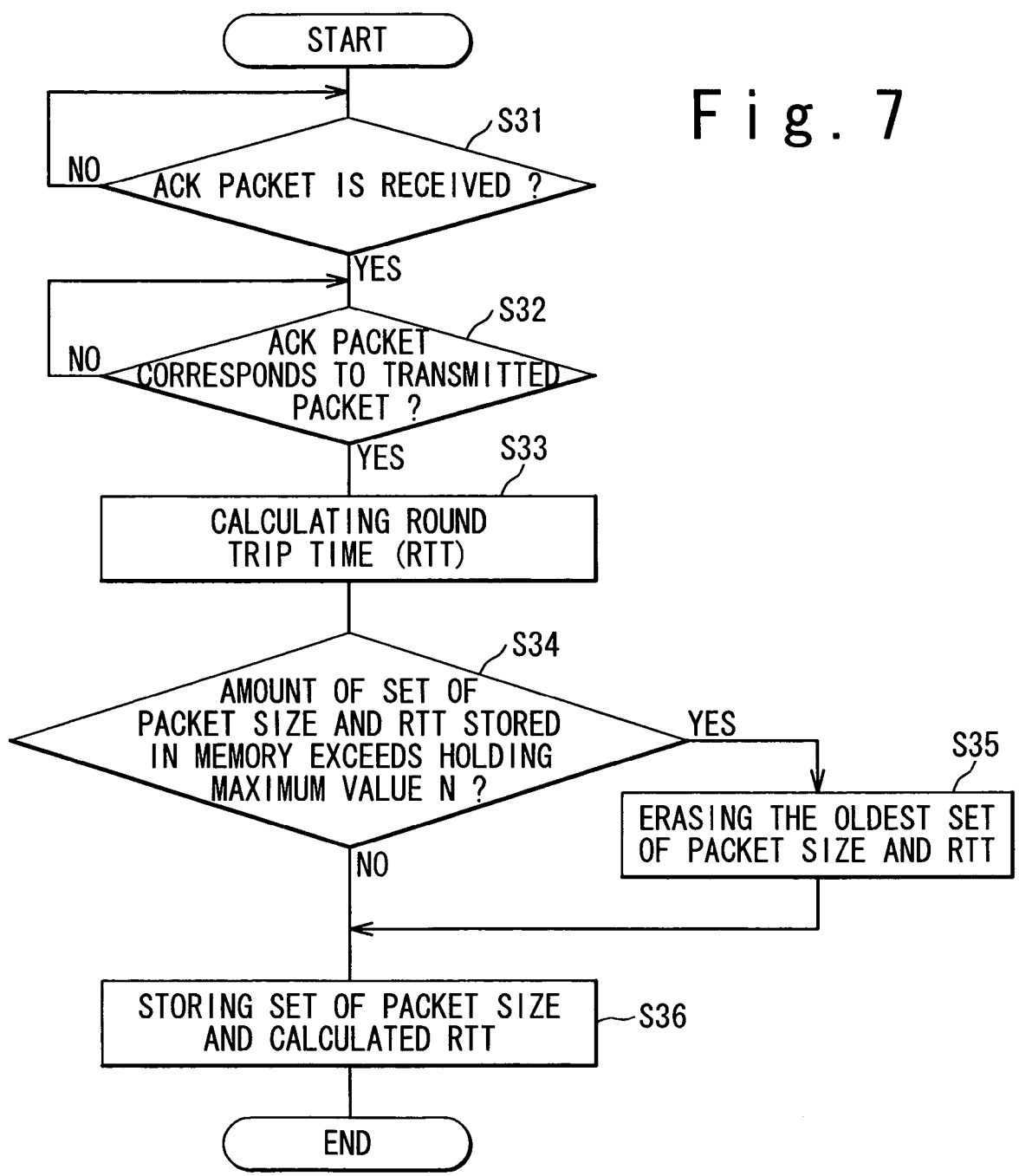
FIG. 7 is a flowchart showing the measuring process for the round trip time (RTT) of the RTT monitoring unit.

FIG. 7 is a flowchart showing the measuring process for the round trip time (RTT) of the RTT monitoring unit 11 of FIG. 1. The measuring process for the round trip time (RTT) of the RTT monitoring unit 11 will be described below with reference to FIG. 7.

After the packet relaying unit 13 transmits the packet including the data to the terminal 3, the RTT monitoring unit 11 monitors the arrival of the acknowledgement (ACK) with regard to that packet. When the acknowledgement (ACK) arrives (Step S31), the RTT monitoring unit 11 judges whether or not it is the expected acknowledgement (ACK) (Step S32).

If it is not the expected acknowledgement (ACK), the RTT monitoring unit 11 successively monitors the arrival of the acknowledgement (ACK). Also, if it is the expected acknowledgement (ACK), the RTT monitoring unit 11 calculates the round trip time (RTT) of the packet transmitted to the terminal 3 (Step S33).

Here, if the amount of the set of the packet size and the round trip time (RTT) stored in the RTT memory unit 21 exceeds the holding maximum value N established for the initial value memory unit 22 (Step S34: Yes), the RTT monitoring unit 11 erases the oldest set of the packet size and the round trip time (RTT) (Step S35). Then, it stores the set of the packet size and the calculated round trip time (RTT) in the RTT memory unit 21 (Step S36).

The range of the value of the holding maximum value N is 2 or more. Since the holding maximum value N is the parameter to indicate the following (tracking) performance to the variation (change, fluctuation) in the round trip time (RTT), the excessively small or excessively large value should not be established. The suitability of the holding maximum value N depends on the applied wireless communication section 101. Therefore, a preliminary tuning is required.

Finally, the retransmission control method in the relay apparatus 1 according to the first embodiment in the present invention is described. If the retransmission timer becomes due, the retransmission timer managing unit 14 reports its fact to the packet relaying unit 13. The packet relaying unit 13 obtains the packet data retransmitted from the packet data memory unit 23, and transmits to the terminal 3.

Figure 8:
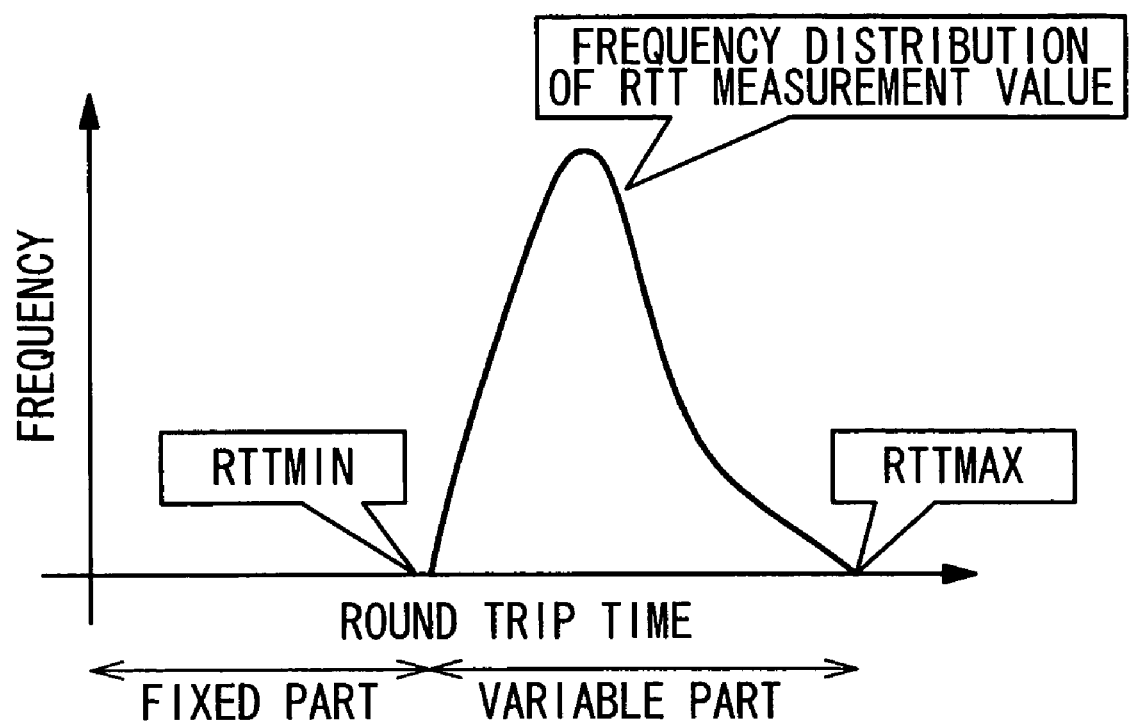
FIG. 8 is a graph showing a distribution example of the RTT according to the first embodiment in the present invention.

FIG. 8 is a graph showing a distribution example of the RTT according to the first embodiment in the present invention. The vertical axis shows frequency, and the horizontal axis shows the Round Trip Time (RTT). The RTT lower than the RTTmin shows the fixed part such as a propagation time which depends on the packet size. The RTT between the RTTmin and the RTTmax shows the variable part such as queue time in the network which does not depend on the packet size.

Figure 9:
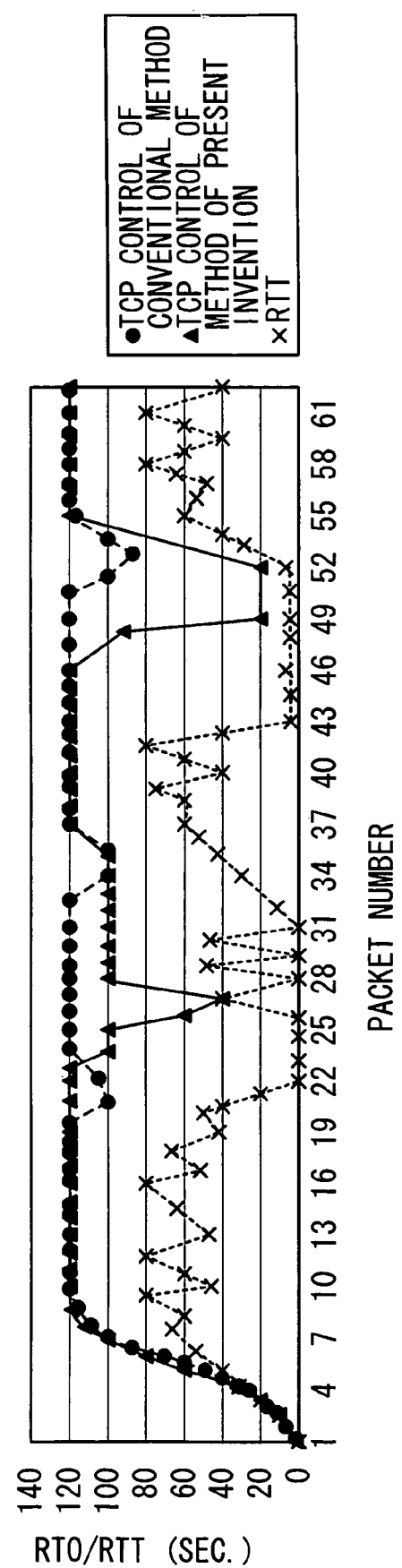
FIG. 9 is a graph showing the retransmission timeout (RTO) simulation result according to the first embodiment in the present invention.

FIG. 9 is a graph showing the retransmission timeout (RTO) simulation result according to the first embodiment in the present invention. The vertical axis shows the Retransmission Time Out (RTO) or the Round Trip Time (RTT), and the horizontal axis shows the packet number. FIG. 9 shows the retransmission timeout (RTO) simulation result in the case when the present invention is applied, and the retransmission timeout (RTO) simulation result in the case when the present invention is not applied. The data used in the simulation are arranged by sampling the round trip time (RTT) value from the actually measured data in a PDC (Personal Digital Cellular) packet switching system, and repeatedly arrayed. The conventional TCP control implies a Jacobson method.

This simulation condition is as follows.

| | |
|---|---|
| Wireless communication rate: | 28.2 Kbps |
| Method: | PDC Packet Switching Method |
| ā: | 2 |
| N: | 5 |

Transmission Packet Size: 1460 byte

| | |
|---|---|
| RTO Minimum Value: | 1 sec |
| RTO Maximum Value: | 120 sec |

In FIG. 9, as for the packet numbers 48 to 51, the retransmission timeout (RTO) is 120 seconds, even though the round trip time (RTT) is only several seconds in the conventional TCP control. Thus, it can not follow the round trip time (RTT) at all.

On the contrary, in the method according to the first embodiment in the present invention, the retransmission timeout (RTO) is between about 10 seconds and 20 seconds. Thus, it can sufficiently follow the RTT. That is, if the packet is lost in this portion of the network, the packet can be retransmitted after 120 seconds in the conventional TCP control. However, in the method according to the first embodiment in the present invention, the packet can be retransmitted within 20 seconds, thereby minimizing the period of non-communication, and greatly improving the throughput. Also, even at the other measurement points, the retransmission timeout (RTO) of the present invention is more appropriate than that of the conventional TCP control.

In this embodiment, the relay apparatus 1 is separated from the server 5. However, it is not limited thereto. The relay apparatus 1 and the server 5 may be installed in the same apparatus. In this embodiment, the relay apparatus 1 is separated from the memory device 2. However, it is not limited thereto. The memory device 2 and the relay apparatus 1 may be installed in the same apparatus.

In this embodiment, in the RTT memory unit 21, its data structure is defined as the session unit of the TCP. However, a method of carrying out a management at a terminal unit may be considered. In this case, the round trip time (RTT) can be shared among a plurality of sessions to the same terminal. Moreover, this has a merit of increasing the precision in the retransmission timeout (RTO).

The Second Embodiment

Figure 10:
FIG. 10 is a view showing a configuration example of an RTT memory unit according to a second embodiment in the present invention.

FIG. 10 is a view showing a configuration example of an RTT memory unit according to a second embodiment in the present invention. In FIG. 10, the RTT memory unit 21 stores the set of expectation communication rates $B_{RATE}$($B_{RATE}$#1, $B_{RATE}$#2, $B_{RATE}$#3, $B_{RATE}$#4, ..., $B_{RATE}$#m) and maximum change delay times (RTTchg) (RTTchg#1, RTTchg#2, RTTchg#3, RTTchg#4 ..., RTTchg#m), which are correlated to traffic situations (T1, T2, T3, T4, ..., Tm) and used under the traffic situations. Here, m and M (m=M) are positive integers.

Figure 11:
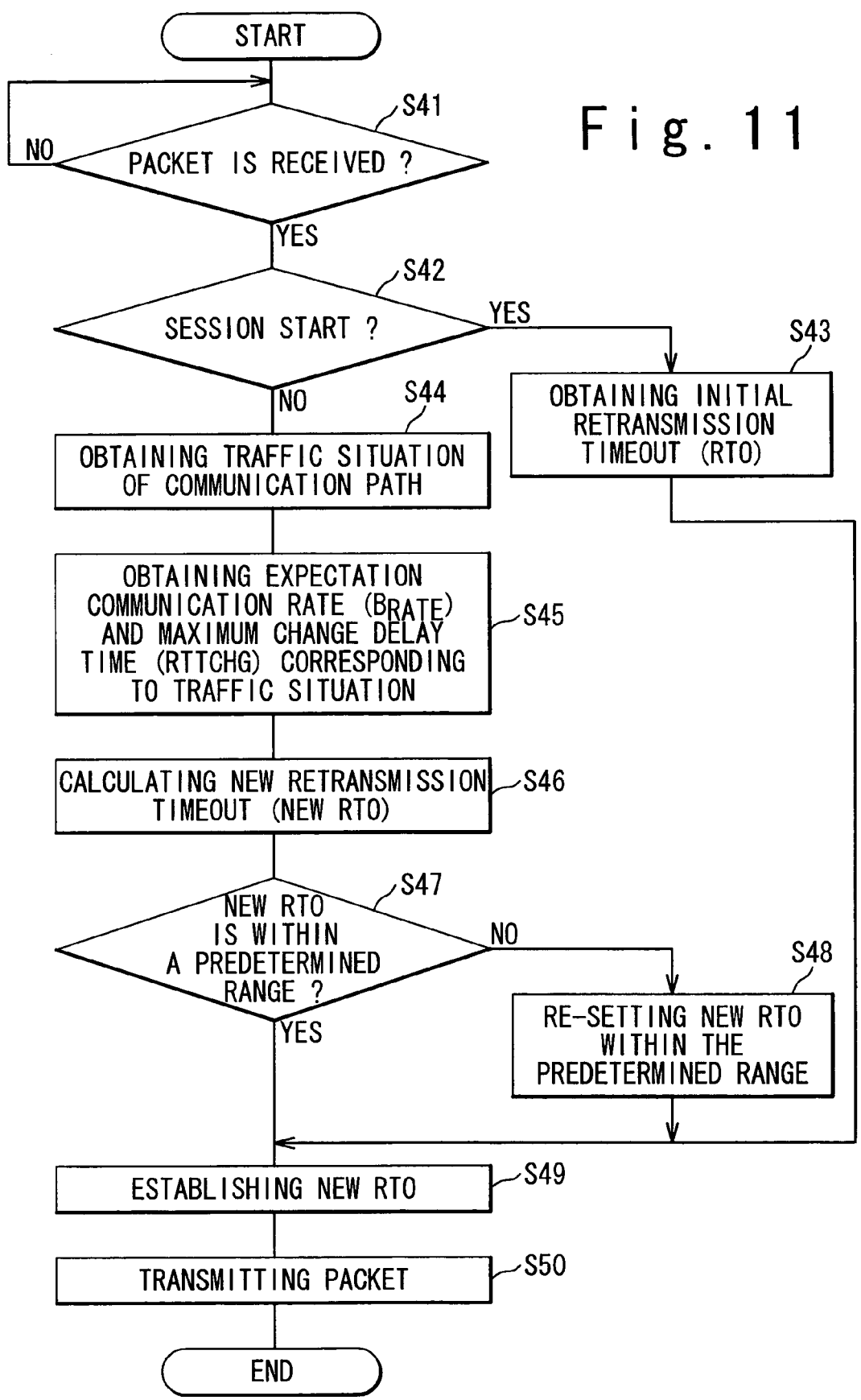
FIG. 11 is a flowchart showing the calculating process for the retransmission timeout (RTO) of the relay apparatus according to the second embodiment in the present invention.

FIG. 11 is a flowchart showing the calculating process for the retransmission timeout (RTO) of the relay apparatus according to the second embodiment in the present invention. The configurations of the wireless communication system and the relay apparatus according to the second embodiment in the present invention are similar to those according to the first embodiment in the present invention shown in FIG. 1. The calculating process for the retransmission timeout (RTO) of the relay apparatus according to the second embodiment in the present invention will be described below with reference to FIGS. 1 and 11.

When the packet arrives from the server 5, the packet relaying unit 13 of the relay apparatus 1 stores the packet in the packet data memory unit 23 of the memory device 2. Then, it investigates the packet size of the packet and reports to the RTO calculating unit 12. The RTO calculating unit 12 judges whether or not the packet is the first packet from which the session (logical start) is started (Steps S41, S42).

The RTO calculating unit 12, if it is the first packet, obtains the retransmission timeout (RTO) from the initial value memory unit 22 (Step S43). It establishes the initial value of the obtained retransmission timeout (RTO) for the retransmission timer managing unit 14 (Step S49). Then, the packet relaying unit 13 carries out the packet transmission (Step S50).

The RTO calculating unit 12, if it is not the first packet, obtains a traffic situation of the communication path (line) including the wireless communication section 101 (Step S44). Then, it obtains the expectation communication rate ($B_{RATE}$) to be expected and the maximum change delay time (RTTchg) to be expected, from the RTT monitoring unit 11 shown in FIG. 10, based on the obtained traffic situation (Step S45) and calculates a new retransmission timeout (new RTO) (Step S46).

The RTO calculating unit 12, if the calculated retransmission timeout (new RTO) is not within the predetermined range established for the initial value memory unit 22 (Step S47: No), re-sets the retransmission timeout (new RTO) to the value within the predetermined range (Step S48). Then, it establishes the value for the retransmission timer managing unit 14 (Step S49).

Also, the RTO calculating unit 12, if the calculated retransmission timeout (new RTO) is within the predetermined range (Step S47: Yes), establishes the retransmission timeout (new RTO) for the retransmission timer managing unit 14 (Step S49). After that, the packet relaying unit 13 transmits the packet to the terminal 3 (Step S50).

In this embodiment, as the obtaining method of the traffic situation is well known, the explanation of its operation and the like is omitted. Also, the expectation communication rate ($B_{RATE}$) and maximum change delay time (RTTchg) corresponding to the traffic situation can be calculated by the above-mentioned method (explanation regarding FIGS. 5 and 6). The calculation value can be related to the traffic situation at that time and stored in the RTT memory unit 21. Hence, the explanation of its method is omitted.

The Third Embodiment

FIG. 12 is a view showing a configuration example of an RTT memory unit according to a third embodiment in the present invention. In FIG. 12, the RTT memory unit 21 stores the set of expectation communication rates ($B_{RATE}$) ($B_{RATE}$#1, $B_{RATE}$#2, $B_{RATE}$#3, $B_{RATE}$#4, ..., $B_{RATE}$#k) and maximum change delay times (RTTchg) (RTTchg#1, RTTchg#2, RTTchg#3, RTTchg#4. ..., RTTchg#k), which are correlated to channel qualities (C1, C2, C3, C4, ..., Ck) and used under the channel qualities. Here, k is a positive integer.

Figure 13:
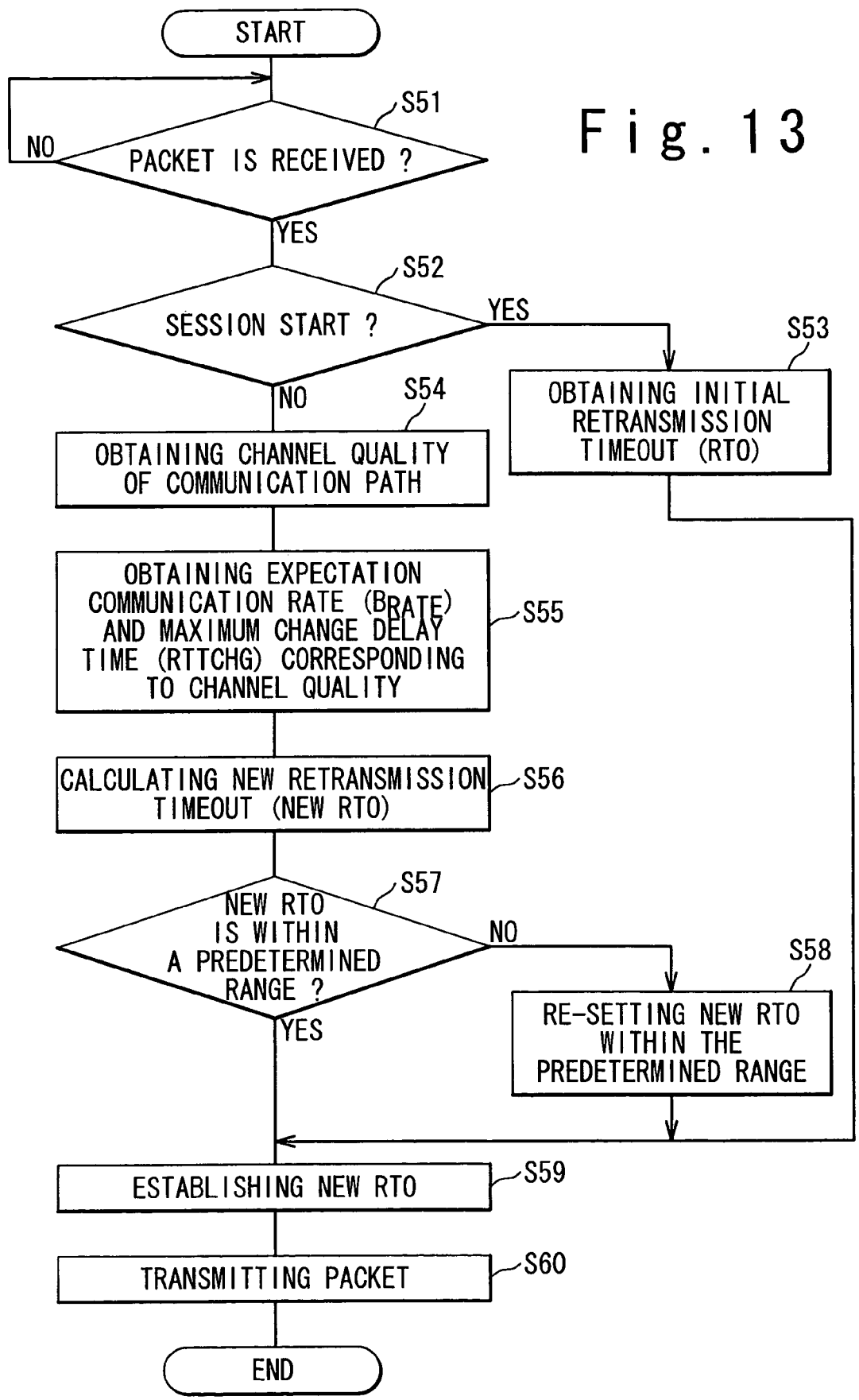
FIG. 13 is a flowchart showing the calculating process for the retransmission timeout (RTO) of the relay apparatus according to the third embodiment in the present invention.

FIG. 13 is a flowchart showing the calculating process for the retransmission timeout (RTO) of the relay apparatus according to the third embodiment in the present invention. The configurations of the wireless communication system and the relay apparatus according to the third embodiment in the present invention are similar to those according to the first embodiment in the present invention shown in FIG. 1. The calculating process for the retransmission timeout (RTO) of the relay apparatus according to the third embodiment in the present invention will be described below with reference to FIGS. 1 and 13.

When the packet arrives from the server 5, the packet relaying unit 13 of the relay apparatus 1 stores the packet in the packet data memory unit 23 of the memory device 2. Then, it investigates the packet size of the packet and reports to the RTO calculating unit 12. The RTO calculating unit 12 judges whether or not the packet is the first packet from which the session (logical start) is started (Steps S51, S52).

The RTO calculating unit 12, if it is the first packet, obtains the retransmission timeout (RTO) from the initial value memory unit 22 (Step S53). It establishes the initial value of the obtained retransmission timeout (RTO) for the retransmission timer managing unit 14 (Step S59). Then, it carries out the packet transmission (Step S60).

The RTO calculating unit 12, if it is not the first packet, obtains a channel quality of the communication path including the wireless communication section 101 (Step S54). Then, it obtains the expectation communication rate ($B_{RATE}$) to be expected and the maximum change delay time (RTchg) to be expected, from the RTT monitoring unit 11 shown in FIG. 12, based on the obtained channel quality (Step S55) and calculates a new retransmission timeout (new RTO) (Step S56).

The RTO calculating unit 12, if the calculated retransmission timeout (new RTO) is not within the predetermined range established for the initial value memory unit 22 (Step S57: No), re-sets the retransmission timeout (new RTO) to the value within the predetermined range (Step S58). It establishes the value for the retransmission timer managing unit 14 (Step S59).

Also, the RTO calculating unit 12, if the calculated retransmission timeout (new RTO) is within the predetermined range (Step S57: Yes), establishes the retransmission timeout (new RTO) for the retransmission timer managing unit 14 (Step S59). After that, the packet relaying unit 13 transmits the packet to the terminal 3 (Step S60).

In this embodiment, as the obtaining method of the channel quality is well known, as the explanation of its operation and the like is omitted. Also, the expectation communication rate ($B_{RATE}$) and maximum change delay time (RTTchg) corresponding to the channel quality can be calculated by the above-mentioned method (explanation regarding FIGS. 5 and 6). The calculation value can be related to the channel quality at that time and store in the RTT memory unit 21. Hence, the explanation of its method is omitted.

In this embodiment, channel qualities are used to sort the sets of expectation communication rates and maximum change delay times. However, time zones can be also used. FIG. 17 is a view showing a configuration another example of an RTT memory unit according to a third embodiment in the present invention. In FIG. 17, the RTT memory unit 21 stores the set of expectation communication rates ($B_{RATE}$) ($B_{RATE}$#1, $B_{RATE}$#2, $B_{RATE}$#3, $B_{RATE}$#4, ..., $B_{RATE}$#p) and maximum change delay times (RTTchg) (RTTchg#1, RTTchg#2, RTTchg#3, RTTchg#4 ..., RTTchg#p), which are correlated to time zones (D1, D2, D3, D4, ..., Dp) and used under the time zones. Here, p is a positive integer. Here, 24 hours of a day are separated to a plurality (p) of the time zones. The time of transmitting the packet, which can be obtained from the clock in the relay apparatus 1, corresponds to one of time zones. Allocating a suitable set of an expectation communication rate and a maximum change delay times to each time zone, the same effects as the case of FIG. 12 can be obtained.

The Fourth Embodiment

Figure 14:
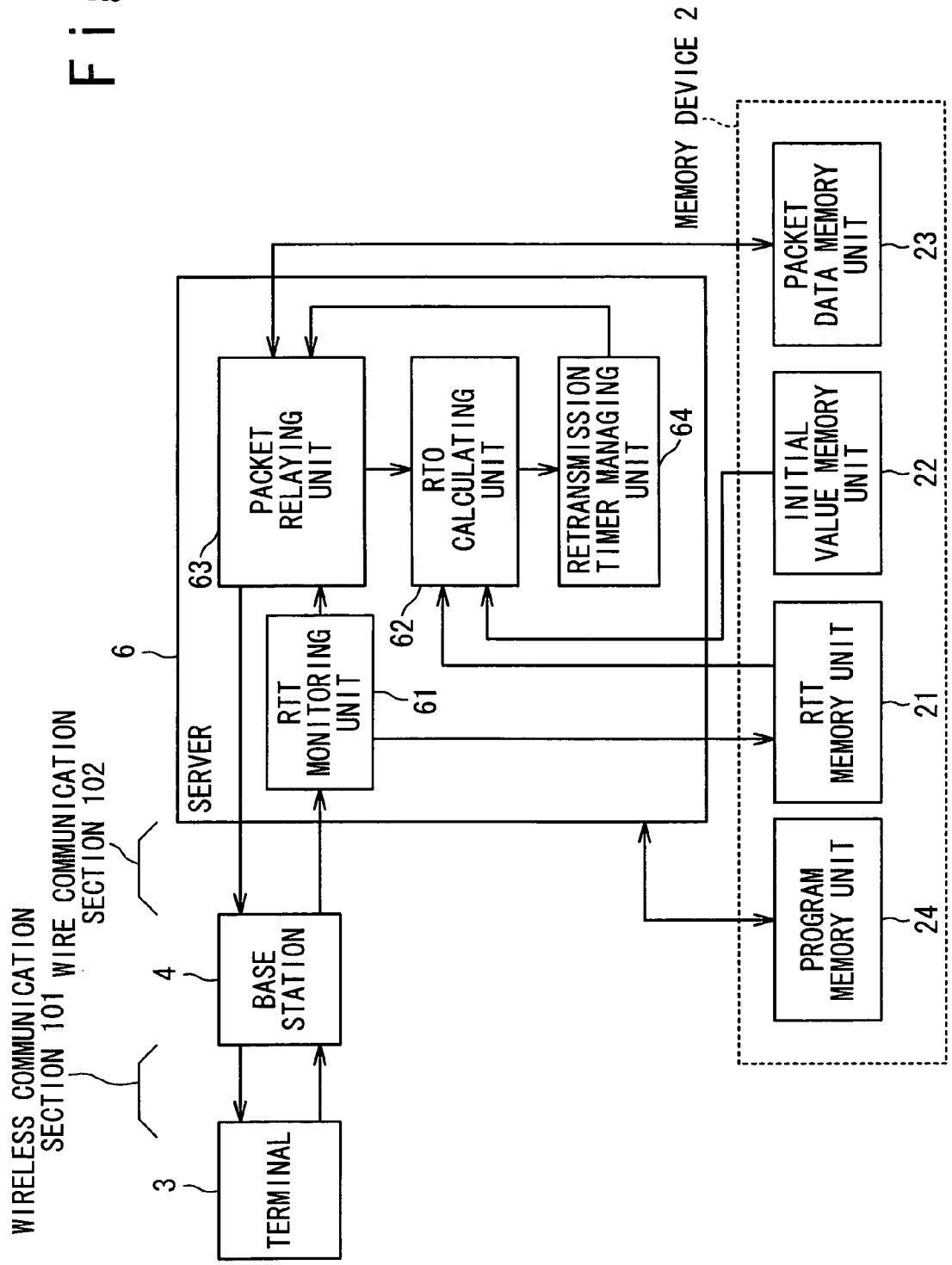
FIG. 14 is a block diagram showing the configuration of a wireless communication system according to a fourth embodiment in the present invention.

FIG. 14 is a block diagram showing the configuration of a wireless communication system according to a fourth embodiment in the present invention. In FIG. 14, the wireless communication system according to the fourth embodiment in the present invention includes the terminal 3, the base station 4 and a server 6. The memory device 2 is connected to the server 6. The memory device 2 may be installed in the server 6. The terminal 3, the base station 4 and the server 6 are the information processing apparatuses (processors).

The wireless communication system according to the fourth embodiment in the present invention is similar in configuration and operation to the wireless communication system according to the first embodiment in the present invention shown in FIG. 1, except that the structure in the relay apparatus 1 is installed in the server 6 and that the relay apparatus 1 is removed. Also, in the fourth embodiment in the present invention, it is possible to carry out the calculating process for the round trip time (RTT) similar to the second and third embodiments in the present invention as mentioned above.

In the fourth embodiment in the present invention, the server 6 does not carry out the data transfer to the base station 4. Thus, instead of the packet relay unit (means), a data transmitting unit (means) 63 is installed in the server 6.

The wireless communication system according to the fourth embodiment of the present invention will be described below in detail. With reference to FIG. 14, the wireless communication system according to the fourth embodiment of the present invention includes: the terminal 3, such as the portable telephone, the PC (Personal Computer) and the like; the base station 4; the server 6, such as a workstation or the like, which is operated based on a program control and the memory device 2 for recording an information. The network between the terminal 3 and the base station 4 is the wireless communication section 101. The network between the base station 4 and the server 6 is the wire communication section 102.

The server 6 includes an RTT monitoring unit (means) 61, an RTO calculating unit (means) 62; a data transmitting unit (means) 63 and a retransmission timer managing unit (means) 64. The memory device 2 includes the RTT memory unit 21, the initial value memory unit 22, the packet data memory unit 23 and the program memory unit 24 for storing a program (a program that can be executed in the computer) to be executed in the server 6. The initial value memory unit 22 preliminarily stores the initial value of the retransmission timeout (RTO), the upper limit value and lower limit value of the retransmission timeout (RTO), the safety coefficient ã and the holding maximum value (number) of the round trip time (RTT) measurement value.

The RTT monitoring unit 61 monitors the packet communication in the communication path including the wireless communication section 101. When receiving the acknowledgement (ACK) from the terminal 3 with regard to the packet (data packet) including the data transmitted by the packet transmitting unit 63, it calculates the round trip time (RTT) which is the differential time between the transmission time of the data packet recorded in the packet and the present time [namely, the reception time of the acknowledgement (ACK)]. It makes the packet size of the packet and the round trip time (RTT) into one set, and then records in the RTT memory unit 21 at the session (logical connection) unit in the TCP. After that, the acknowledgement (ACK) is passed to the packet transmitting unit 63 without modification.

The RTO calculating unit 62 calculates the retransmission timeout (RTO) when the packet is transmitted from the packet transmitting unit 63 to the terminal 3. At first, the RTO calculating unit 62 obtains the packet size of the packet that is going to be transmitted from the packet transmitting unit 63. Next, the RTO calculating unit 62 retrieves the maximum value and the minimum value from the round trip time (RTT) stored in the RTT memory unit 21. Then, it obtains them together with the combined packet sizes.

Finally, the RTO calculating unit 62 calculates the retransmission timeout (RTO) from the packet size of the packet to be transmitted from now and the packet size in which the maximum value and minimum value in the round trip time (RTT) are combined, and establishes for a retransmission timer managing unit 64.

Also, since the calculated retransmission timeout (RTO) does not exist at the time of the connection start, the RTO calculating unit 62 establishes, for the retransmission timer managing unit 64, the initial value of the retransmission timeout (RTO) obtained from the initial value memory unit 22 as the retransmission timeout (RTO).

The data transmitting unit 63 transmits the packet, for the communication to the terminal 3 from the server 5, through the wire communication section 102 to the communication path including the wireless communication section 101.

The retransmission timer managing unit 64 has therein the retransmission timer (not shown). When the retransmission timeout (RTO) is established, it waits for the elapse of the established time from that time point. If the established time is elapsed, it reports the retransmission timeout to the packet transmitting unit 63. The packet transmitting unit 63 receiving the report obtains the packet data to be retransmitted, from the packet data memory unit 23, and carries out the packet transmission.

Consequently, in this embodiment, in the case of the variation in the round trip time (RTT) of the communication path including the wireless communication section 101, it is possible to carry out the retransmission control quickly following the network situation of the wireless communication section 101. In the case of the sharp increase in the round trip time (RTT), it is possible to protect the repetition of the useless retransmissions. In the case of the sharp decrease in the round trip time (RTT), it is possible to prevent requiring the long time until the detection of the packet loss. These lead to improving the throughput.

The Fifth Embodiment

Figure 15:
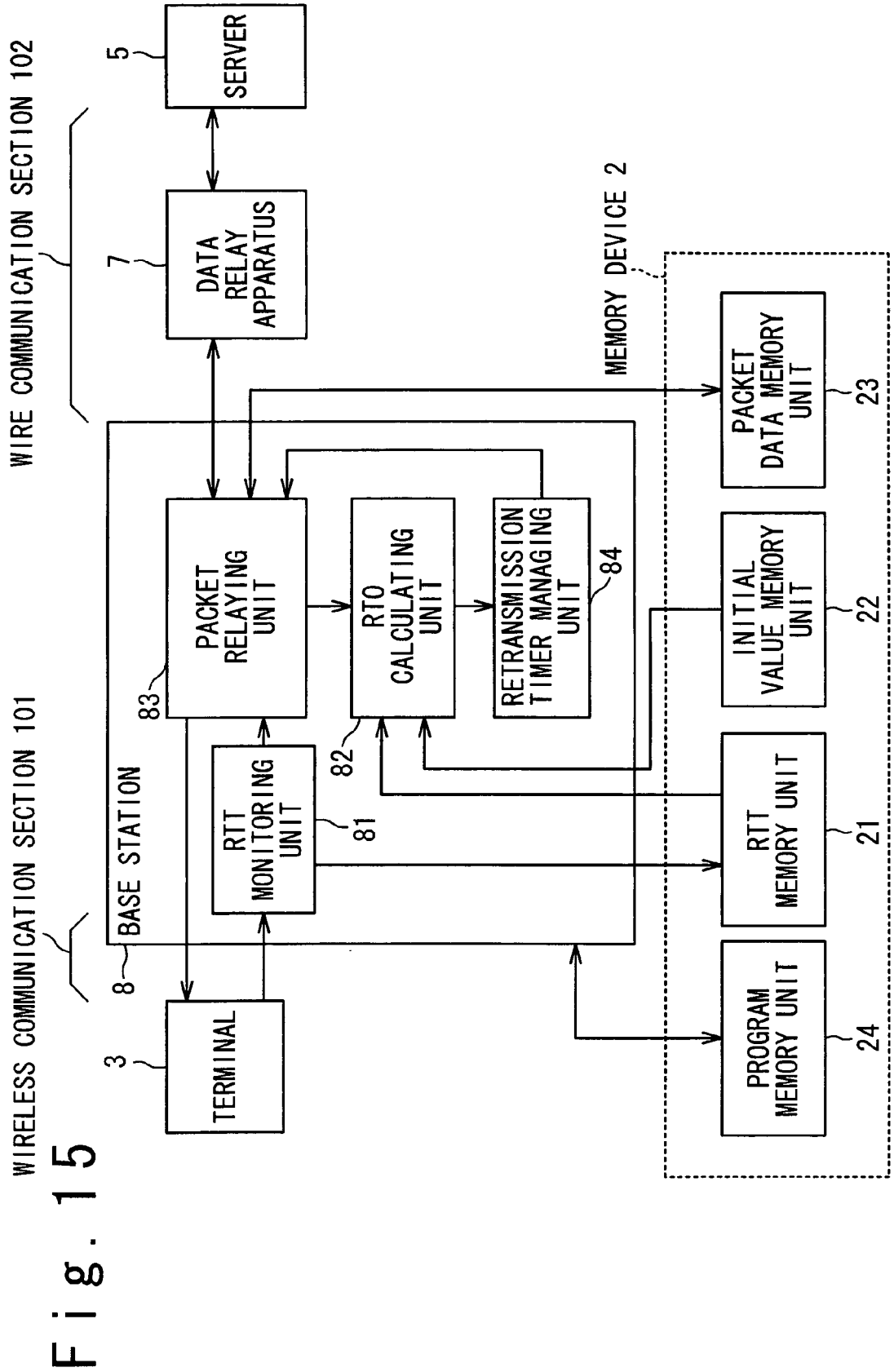
FIG. 15 is a block diagram showing the configuration of a wireless communication system according to a fifth embodiment in the present invention.

FIG. 15 is a block diagram showing the configuration of a wireless communication system according to a fifth embodiment in the present invention. In FIG. 15, the wireless communication system according to the fifth embodiment in the present invention includes a data relay apparatus (hereafter, referred to as a relay apparatus) 7, the terminal 3, a base station 8 and the server 5. The memory device 2 is connected to the base station 8. The memory device 2 may be installed in the base station 8. The terminal 3, the base station 8, the relay apparatus 7 and the server 5 are the information processing apparatuses (processors).

The wireless communication system according to the fifth embodiment in the present invention is similar in configuration and operation to the wireless communication system according to the first embodiment in the present invention shown in FIG. 1, except that the structure in the relay apparatus 1 is installed in the base station 8. Also, in the fifth embodiment in the present invention, it is possible to carry out the calculating process for the round trip time (RTT) similar to the second and third embodiments in the present invention as mentioned above.

The wireless communication system according to the fifth embodiment of the present invention will be described below in detail. With reference to FIG. 15, the wireless communication system according to the fifth embodiment of the present invention includes: the terminal 3, such as the portable telephone, the PC (personal computer) and the like; the base station 8, which is operated based on a program control; the relay apparatus 7; the server 5 such as the workstation and the like and the memory device 2 for recording an information. The network between the terminal and the base station 8 is the wireless communication section 101. The network between the base station 8 and the server 5 through the relay apparatus 7 is the wire communication section 102.

The base station 8 includes an RTT monitoring unit (means) 81, an RTO calculating unit (means) 82; a packet transmitting unit (means) 83 and a retransmission timer managing unit (means) 84. The memory device 2 includes the RTT memory unit 21, the initial value memory unit 22, the packet data memory unit 23 and the program memory unit 24 for storing a program (a program that can be executed in the computer) to be executed in the base station 8. The initial value memory unit 22 preliminarily stores the initial value of the retransmission timeout (RTO), the upper limit value and lower limit value of the retransmission timeout (RTO), the safety coefficient ã and the holding maximum value (number) of the round trip time (RTT) measurement value.

The RTT monitoring unit 81 monitors the packet communication in the communication path including the wireless communication section 101. When receiving the acknowledgement (ACK) from the terminal 3 with regard to the packet (data packet) including the data transmitted by the packet transmitting unit 83, it calculates the round trip time (RTT) which is the differential time between the transmission time of the data packet recorded in the packet and the present time [namely, the reception time of the acknowledgement (ACK)]. It makes the packet size of the packet and the round trip time (RTT) into one set, and then records in the RTT memory unit 21 at the session (logical connection) unit in the TCP. After that, the acknowledgement (ACK) is passed to the packet transmitting unit 83 without modification.

The RTO calculating unit 82 calculates the retransmission timeout (RTO) when the packet is transmitted from the packet relaying unit 83 to the terminal 3. At first, the RTO calculating unit 82 obtains the packet size of the packet that is going to be transmitted from the packet transmitting unit 83. Next, the RTO calculating unit 82 retrieves the maximum value and the minimum value from the round trip time (RTT) stored in the RTT memory unit 21. Then, it obtains them together with the combined packet sizes.

Finally, the RTO calculating unit 82 calculates the retransmission timeout (RTO) from the packet size of the packet to be transmitted from now and the packet size in which the maximum value and minimum value in the round trip time (RTT) are combined, and establishes for a retransmission timer managing unit 84.

Also, since the calculated retransmission timeout (RTO) does not exist at the time of the connection start, the RTO calculating unit 82 establishes, for the retransmission timer managing unit 84, the initial value of the retransmission timeout (RTO) obtained from the initial value memory unit 22 as the retransmission timeout (RTO).

The packet relaying unit 83 carries out the packet relay between the wire communication section 102 and the communication path including the wireless communication section 101. The packet relaying unit 83 stores the received packet in the packet data memory unit 23, and relays the packet arriving from the communication path including the wireless communication section 101, to the wire communication section 102. Also in the opposite direction, it similarly relays from the wire communication section 102 to the communication path including the wireless communication section 101.

The retransmission timer managing unit 84 has therein the retransmission timer (not shown). When the retransmission timeout (RTO) is established, it waits for the elapse of the established time from that time point. If the established time is elapsed, it reports the retransmission timeout to the packet relaying unit 83. The packet relaying unit 83 receiving the report obtains the packet data to be retransmitted, from the packet data memory unit 23, and carries out the packet transmission.

Consequently, in this embodiment, in the case of the variation in the round trip time (RTT) of the communication path including the wireless communication section 101, it is possible to carry out the retransmission control quickly following the network situation of the wireless communication section 101. In the case of the sharp increase in the round trip time (RTT), it is possible to protect the repetition of the useless retransmissions. In the case of the sharp decrease in the round trip time (RTT), it is possible to prevent requiring the long time until the detection of the packet loss. These leads to improving the throughput.

The Sixth Embodiment

Figure 16:
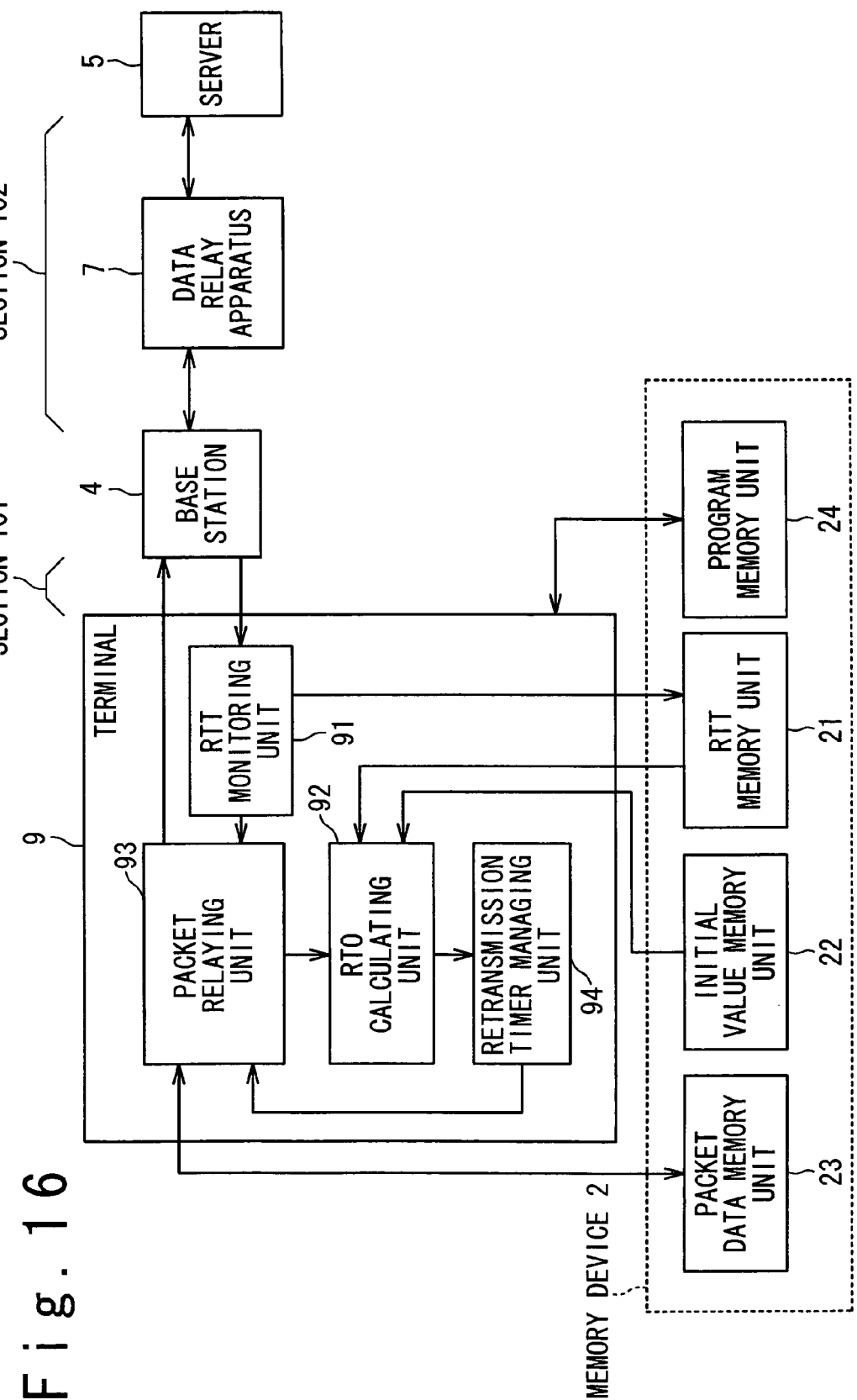
FIG. 16 is a block diagram showing the configuration of a wireless communication system according to a sixth embodiment in the present invention.

FIG. 16 is a block diagram showing the configuration of a wireless communication system according to a sixth embodiment in the present invention. In FIG. 16, the wireless communication system according to the sixth embodiment in the present invention includes a terminal 9, the base station 4, the relay apparatus 7 and the server 5. The memory device 2 is connected to the terminal 9. The memory device 2 may be installed in the server 6. The terminal 9, the base station 4, the relay apparatus 7 and the server 5 are the information processing apparatuses (processors).

The wireless communication system according to the sixth embodiment in the present invention is similar in configuration and operation to the wireless communication system according to the first embodiment in the present invention shown in FIG. 1, except that the structure in the relay apparatus 1 is installed in the terminal 9. Also, in the sixth embodiment in the present invention, it is possible to carry out the calculating process for the round trip time (RTT) similar to the second and third embodiments in the present invention as mentioned above.

The wireless communication system according to the sixth embodiment of the present invention will be described below in detail. With reference to FIG. 16, the wireless communication system according to the sixth embodiment of the present invention includes: the terminal 9, such as the portable telephone, the PC (Personal Computer) and the like, which is operated based on a program control; the base station 4; the relay apparatus 7; the server 5 such as the workstation and the like and the memory device 2 for recording an information. The network between the terminal 9 and the base station 4 is the wireless communication section 101. The network between the base station 4 and the server 5 through the relay apparatus 7 is the wire communication section 102.

The terminal 9 includes an RTT monitoring unit (means) 91, an RTO calculating unit (means) 92; a packet transmitting unit (means) 93 and a retransmission timer managing unit (means) 94. The memory device 2 includes the RTT memory unit 21, the initial value memory unit 22, the packet data memory unit 23 and the program memory unit 24 for storing a program (a program that can be executed in the computer) to be executed in the terminal 9. The initial value memory unit 22 preliminarily stores the initial value of the retransmission timeout (RTO), the upper limit value and lower limit value of the retransmission timeout (RTO), the safety coefficient $\tilde{a}$ and the holding maximum value (number) of the round trip time (RTT) measurement value.

The RTT monitoring unit 91 monitors the packet communication in the wireless communication section 101. When receiving the acknowledgement (ACK) from the terminal 3 with regard to the packet (data packet) including the data transmitted by the packet transmitting unit 93, it calculates the round trip time (RTT) which is the differential time between the transmission time of the data packet recorded in the packet and the present time [namely, the reception time of the acknowledgement (ACK)]. It makes the packet size of the packet and the round trip time (RTT) into one set, and then records in the RTT memory unit 21 at the session (logical connection) unit in the TCP. After that, the acknowledgement (ACK) is passed to the packet transmitting unit 93 without modification.

The RTO calculating unit 92 calculates the retransmission timeout (RTO) when the packet is transmitted from the packet transmitting unit 93 to the terminal 3. At first, the RTO calculating unit 92 obtains the packet size of the packet that is going to be transmitted from the packet transmitting unit 93. Next, the RTO calculating unit 92 retrieves the maximum value and the minimum value from the round trip time (RTT) stored in the RTT memory unit 21. Then, it obtains them together with the combined packet sizes.

Finally, the RTO calculating unit 92 calculates the retransmission timeout (RTO) from the packet size of the packet to be transmitted from now and the packet size in which the maximum value and minimum value in the round trip time (RTT) are combined, and establishes for a retransmission timer managing unit 94.

Also, since the calculated retransmission timeout (RTO) does not exist at the time of the connection start, the RTO calculating unit 92 establishes, for the retransmission timer managing unit 94, the initial value of the retransmission timeout (RTO) obtained from the initial value memory unit 22 as the retransmission timeout (RTO).

The packet transmitting unit 93 transmits the packet for the sake of the communication to the server 5 from the terminal 9, through the wireless communication section 101 to the wire communication section 102.

The retransmission timer managing unit 94 has therein the retransmission timer (not shown). When the retransmission timeout (RTO) is established, it waits for the elapse of the established time from that time point. If the established time is elapsed, it reports the retransmission timeout to the packet transmitting unit 93. The packet transmitting unit 93 receiving the report obtains the packet data to be retransmitted, from the packet data memory unit 23, and carries out the packet transmission.

Consequently, in this embodiment, in the case of the variation in the round trip time (RTT) of the communication path including the wireless communication section 101, it is possible to carry out the retransmission control quickly following the network situation of the wireless communication section 101. In the case of the sharp increase in the round trip time (RTT), it is possible to protect the repetition of the useless retransmissions. In the case of the sharp decrease in the round trip time (RTT), it is possible to prevent requiring the long time until the detection of the packet loss. These lead to improving the throughput.

In this way, in the present invention, with regard to the variation in the round trip time (RTT), the following performance of the retransmission timeout (RTO) can be increased, thereby judging the loss of the packet suitably. Thus, it is possible to reduce the useless waiting time and also possible to improve the throughput. Also, in the present invention, since the variation in the round trip time (RTT) RTT is contained in the coefficient, the probability that the cross between the retransmission packet and the acknowledgement (ACK) caused by the excessively small retransmission timeout (RTO) is carried out is reduced so that the improvement of the line usage efficiency is expected.

In the conventional TCP control, the round trip time (RTT) is determined on the basis of the calculation that uses the average deviation of the round trip times (RTT). Thus, if the round trip time (RTT) is sharply increased, the retransmission timeout (RTO) is also increased. Even once the round trip time (RTT) is returned to the small value, it is difficult to return the thus-increased retransmission timeout (RTO) to the correct value.

However, as shown in FIG. 8, the present invention uses the minimum value (RTTmin) of the round trip time (RTT) representative of the fixed time component, which depends on the packet size such as a propagation time and the like, and the maximum value (RTTmax) of the round trip time (RTT) representative of the time containing the variable time component which does not depend on the packet size. Thus, it is possible to calculate the retransmission timeout (RTO) that is optimal for the wireless communication section 101 at that time with regard to the transmission packet.

Also, in the present invention, the influence of a specific value such as the case of the sharp increase in the round trip time (RTT) and the like can be suppressed to the certain time, on the basis of the number N of the combinations of the packet sizes and the round trip times (RTT) stored in the RTT memory unit 21. Thus, it is possible to increase the following performance of the retransmission timeout (RTO).

In the respective embodiments of the present invention as mentioned above, the RTT memory unit stores the histories of the monitored results of the round trip times (RTT). However, those information can be collected as a database. In this case, the optimal retransmission timeout (RTO) can be calculated by considering the time band at which the packet is transmitted and the like, in addition to the traffic situation and the channel quality.

As mentioned above, in the present invention, due to the employment of the above-mentioned configuration and operation, it is possible to obtain the effect of improving the throughput and optimizing the communication utilization rate.

What is claimed is:

1. A wireless communication system comprising:
   a mobile terminal;
   a base station apparatus operable to communicate via a wireless communication line with the mobile terminal;
   a data relay apparatus operable to communicate with the base station; and
   a server apparatus,
   wherein one of said mobile terminal, said base station apparatus, said data relay apparatus and said server apparatus includes:
   a transmitting unit operable to transmit transmission data and to receive acknowledgement data corresponding to said transmission data through a communication line;
   a monitoring unit operable to monitor said transmission data and said acknowledgement data;
   a determining unit operable to determine a retransmission timeout period based on a monitored result by said monitoring unit in a certain period;
   said transmitting unit is operable to retransmit said transmission data when said acknowledgement data is not received within said retransmission timeout period,
   wherein said monitoring unit is operable to monitor a round trip time and a data size (Dmin, Dmax, Dsize) of said transmission data, the round trip time being a time difference between a transmission time of the transmission data and a reception time of the acknowledgment data.

2. The wireless communication system according to claim 1, wherein said communication line includes a wireless communication line and the wire communication line.

3. The wireless communication system according to claim 2, wherein said determining unit determines said retransmission timeout period based on said monitored result in a most recent certain period.

4. The wireless communication system according to claim 1, wherein said determining unit determines said retransmission timeout period by a calculation based on the minimum of said round trip time, a data size of the minimum of said round trip time, the maximum of said round trip time and a data size of the maximum of said round trip time.

5. The wireless communication system according to claim 4, wherein said determining unit estimates an expectation communication rate of said communication line based on said data size of the minimum of said round trip time and the minimum of said round trip time, and calculates said retransmission timeout period based on said expectation communication rate and a data size of said transmission data, the maximum of said round trip time and said data size of the maximum of said round trip time.

6. The wireless communication system according to claim 5, further including:
   a memory unit which stores a monitoring history of said round trip time and said data size,
   wherein said determining unit uses said data size of the minimum of said round trip time and the minimum of said round trip time stored in said memory unit for estimating said expectation communication rate.

7. The wireless communication system according to claim 6, wherein said determining unit estimates a maximum variation delay time of said communication line based on said data size of the maximum of said round trip time, the maximum of said round trip time and said expectation communication rate, and calculates said retransmission timeout period based on said expectation communication rate, said maximum variation delay time and said data size of said transmission data.

8. The wireless communication system according to claim 1, further including:
   a storage unit which associates a usage situation of said communication line with an expectation communication rate of said communication line and a maximum variation delay time of said communication line, and stores them,
   wherein said determining unit obtains said usage situation of said communication line, and calculates said retransmission timeout period based on said data size of said transmission data, said usage situation, said expectation communication rate and said maximum variation delay time, and said expectation communication rate and said maximum variation delay time are obtained from said storage unit based on said usage situation.

9. The wireless communication system according to claim 8, wherein said usage situation is one of a traffic condition of said communication line, a channel quality of said communication line and a time zone of a time of transmitting said transmission data.

10. An information processing apparatus used for a wireless communication, comprising:
   a transmitting unit operable to transmit transmission data and to receive acknowledgement data corresponding to said transmission data through a communication line;
   a monitoring unit operable to monitor said transmission data and said acknowledgement data; and
   a determining unit operable to determine a retransmission timeout period based on a monitored result by said monitoring unit within a certain period;
   wherein said transmitting unit retransmits said transmission data when said acknowledgement data is not received in said retransmission timeout period,
   wherein said monitoring unit is operable to monitor a round trip time and a data size (Dmin, Dmax, Dsize) of said transmission data, the round trip time being a time difference between a transmission time of the transmission data and a reception time of the acknowledgment data.

11. The information processing apparatus according to claim 10, wherein said communication line includes a wireless communication line and the wire communication line.

12. The information processing apparatus according to claim 11, wherein said determining unit determines said retransmission timeout period based on said monitored result in a most recent certain period.

13. The information processing apparatus according to claim 10, wherein said determining unit determines said retransmission timeout period by a calculation based on the minimum of said round trip time, a data size of the minimum of said round trip time, the maximum of said round trip time and a data size of the maximum of said round trip time.

14. The information processing apparatus according to claim 10, wherein said determining unit estimates an expectation communication rate of said communication line based on said data size of the minimum of said round trip time and the minimum of said round trip time, and calculates said retransmission timeout period based on said expectation communication rate and a data size of said transmission data, the maximum of said round trip time and said data size of the maximum of said round trip time.

15. The information processing apparatus according to claim 14, further comprising:
   a memory unit which stores a monitoring history of said round trip time and said data size,
   wherein said determining unit uses said data size of the minimum of said round trip time and the minimum of said round trip time stored in said memory unit for estimating said expectation communication rate.

16. The information processing apparatus according to claim 15, wherein said determining unit estimates a maximum variation delay time of said communication line based on said data size of the maximum of said round trip time, the maximum of said round trip time and said expectation communication rate, and calculates said retransmission timeout period based on said expectation communication rate, said maximum variation delay time and said data size of said transmission data.

17. The information processing apparatus according to claim 10, further comprising:
   a storage unit which associates a usage situation of said communication line with an expectation communication rate of said communication line and a maximum variation delay time of said communication line, and stores them,
   wherein said determining unit obtains said usage situation of said communication line, and calculates said retransmission timeout period based on said data size of said transmission data, said usage situation, said expectation communication rate and said maximum variation delay time, and
   said expectation communication rate and said maximum variation delay time are obtained from said storage unit based on said usage situation.

18. The information processing apparatus according to claim 17, wherein said usage situation is one of a traffic condition of said communication line, a channel quality of said communication line and a time zone of a time of transmitting said transmission data.

19. A mobile terminal used for a wireless communication, comprising:
   a transmitting unit operable to transmit transmission data and to receive acknowledgement data corresponding to said transmission data through a communication line;
   a monitoring unit operable to monitor said transmission data and said acknowledgement data; and
   a determining unit operable to monitor a retransmission timeout period based on a monitored result by said monitoring unit in a certain period;
   wherein said transmitting unit is operable to retransmit said transmission data when said acknowledgement data is not received within said retransmission timeout period,
   wherein said monitoring unit is operable to monitor a round trip time and a data size (Dmin, Dmax, Dsize) of said transmission data, the round trip time being a time difference between a transmission time of the transmission data and a reception time of the acknowledgment data.

20. The mobile terminal according to claim 19, wherein said communication line includes a wireless communication line and the a wire communication line.

21. The mobile terminal according to claim 20, wherein said determining unit determines said retransmission timeout period based on said monitored result in a most recent certain period.

22. The mobile terminal according to claim 19, wherein said determining unit determines said retransmission timeout period by a calculation based on the minimum of said round trip time, a data size of the minimum of said round trip time, the maximum of said round trip time and a data size of the maximum of said round trip time.

23. The mobile terminal according to claim 19, wherein said determining unit estimates an expectation communication rate of said communication line based on said data size of the minimum of said round trip time and the minimum of said round trip time, and calculates said retransmission timeout period based on said expectation communication rate and a data size of said transmission data, the maximum of said round trip time and said data size of the maximum of said round trip time.

24. The mobile terminal according to claim 23, further comprising:
   a memory unit which stores a monitoring history of said round trip time and said data size, wherein said determining unit uses said data size of the minimum of said round trip time and the minimum of said round trip time stored in said memory unit for estimating said expectation communication rate.

25. The mobile terminal according to claim 24, wherein said determining unit estimates a maximum variation delay time of said communication line based on said data size of the maximum of said round trip time, the maximum of said round trip time and said expectation communication rate, and calculates said retransmission timeout period based on said expectation communication rate, said maximum variation delay time and said data size of said transmission data.

26. The mobile terminal according to claim 19, further comprising:
a storage unit which associates a usage situation of said communication line with an expectation communication rate of said communication line and a maximum variation delay time of said communication line, and stores them,
wherein said determining unit obtains said usage situation of said communication line, and calculates said retransmission timeout period based on said data size of said transmission data, said usage situation, said expectation communication rate and said maximum variation delay time, and
said expectation communication rate and said maximum variation delay time are obtained from said storage unit based on said usage situation.

27. The mobile terminal according to claim 26, wherein said usage situation is one of a traffic condition of said communication line, a channel quality of said communication line and a time zone of a time of transmitting said transmission data.

28. A determination method of a retransmission timeout period, comprising:
transmitting a transmission data and receiving an acknowledgement data which corresponds to said transmission data through a communication line;
monitoring said transmission data and said acknowledgement data; and
determining a retransmission timeout period based on a monitored result in a certain period;
wherein said transmission data is retransmitted when said acknowledgement data is not received within said retransmission timeout period,
wherein is said monitoring the transmission data and the acknowledgement data, a round trip time and a data size (Dmin, Dmax, Dsize) of said transmission data are monitored, the round trip time being a time difference between a transmission time of the transmission data and a reception time of the acknowledgment data.

29. The determination method according to claim 28, wherein said communication line includes a wireless communication line and a wire communication line.

30. The determination method according to claim 29, wherein said determining step includes:
determining said retransmission timeout period based on said monitored result in a most recent certain period.

31. The determination method according to claim 28, wherein said determining step includes:
determining said retransmission timeout period by a calculation based on the minimum of said round trip time, a data size of the minimum of said round trip time, the maximum of said round trip time and a data size of the maximum of said round trip time.

32. The determination method according to claim 31, wherein said determining step includes:
estimating an expectation communication rate of said communication line based on said data size of the minimum of said round trip time and the minimum of said round trip time, and
calculating said retransmission timeout period based on said expectation communication rate and a data size of said transmission data, the maximum of said round trip time and said data size of the maximum of said round trip time.

33. The determination method according to claim 32, further comprising:
storing a monitoring history of said round trip time and said data size,
wherein in said estimating step, said data size of the minimum of said round trip time and the minimum of said round trip time stored in said memory unit are used for estimating said expectation communication rate.

34. The determination method according to claim 33, wherein said calculating step includes:
estimating a maximum variation delay time of said communication line based on said data size of the maximum of said round trip time, the maximum of said round trip time and said expectation communication rate, and
calculating said retransmission timeout period based on said expectation communication rate, said maximum variation delay time and said data size of said transmission data.

35. The determination method according to claim 28, further comprising:
associating a usage situation of said communication line with an expectation communication rate of said communication line and a maximum variation delay time of said communication line,
storing said usage situation, said expectation communication rate and said maximum variation delay time,
obtaining said usage situation of said communication line, and
calculating said retransmission timeout period based on said data size of said transmission data, said usage situation, said expectation communication rate and said maximum variation delay time,
wherein said expectation communication rate and said maximum variation delay time are obtained from said storage unit based on said usage situation.

36. The determination method according to claim 35, wherein said usage situation is one of a traffic condition of said communication line, a channel quality of said communication line and a time zone of a time of transmitting said transmission data.

37. A computer-readable medium including a computer program comprising code operable to control a computer, the code comprising:
instructions to transmit a transmission data and receiving an acknowledgement data which corresponds to said transmission data through a communication line;
instructions to monitor said transmission data and said acknowledgement data; and
instructions to determine a retransmission timeout period based on a monitored result in a certain period;
wherein said transmission data is retransmitted when said acknowledgement data is not received within said retransmission timeout period,
wherein said instructions to monitoring the transmission data and the acknowledgement data include instructions to monitor a round trip time and a data size (Dmin, Dmax, Dsize) of said transmission data, the round trip time being a time difference between a transmission time of the transmission data and a reception time of the acknowledgment data.

38. The computer program product according to claim 37, wherein said communication line includes a wireless communication line and a wire communication line.

39. The computer program product according to claim 38, wherein said determining step includes:
   determining said retransmission timeout period based on said monitored result in the most recent certain period.

40. The computer program product according to claim 37, wherein said determining step includes:
   determining said retransmission timeout period by a calculation based on the minimum of said round trip time, a data size of the minimum of said round trip time, the maximum of said round trip time and a data size of the maximum of said round trip time.

41. The computer program product according to claim 40, wherein said determining step includes:
   estimating an expectation communication rate of said communication line based on said data size of the minimum of said round trip time and the minimum of said round trip time, and
   calculating said retransmission timeout period based on said expectation communication rate and a data size of said transmission data, the maximum of said round trip time and said data size of the maximum of said round trip time.

42. The computer program product according to claim 41, further comprising:
   storing a monitoring history of said round trip time and said data size,
   wherein in said estimating step, said data size of the minimum of said round trip time and the minimum of said round trip time stored in said memory unit are used for estimating said expectation communication rate.

43. The computer program product according to claim 42, wherein said calculating step includes:
   estimating a maximum variation delay time of said communication line based on said data size of the maximum of said round trip time, the maximum of said round trip time and said expectation communication rate, and
   calculating said retransmission timeout period based on said expectation communication rate, said maximum variation delay time and said data size of said transmission data.

44. The computer program product according to claim 37, further comprising:
   associating a usage situation of said communication line with an expectation communication rate of said communication line and a maximum variation delay time of said communication line,
   storing said usage situation, said expectation communication rate and said maximum variation delay time,
   obtaining said usage situation of said communication line, and
   calculating said retransmission timeout period based on said data size of said transmission data, said usage situation, said expectation communication rate and said maximum variation delay time,
   wherein said expectation communication rate and said maximum variation delay time are obtained from said storage unit based on said usage situation.

45. The computer program product according to claim 44, wherein said usage situation is one of a traffic condition of said communication line, a channel quality of said communication line and a time zone of a time of transmitting said transmission data.

* * * * *